United States Patent
Matsuhiro et al.

(10) Patent No.: US 8,823,783 B2
(45) Date of Patent: Sep. 2, 2014

(54) STEREOSCOPIC IMAGE DISPLAY APPARATUS AND METHOD

(75) Inventors: Kenji Matsuhiro, Tokyo (JP); Michiyuki Kohno, Tokyo (JP)

(73) Assignee: Arisawa Mfg. Co., Ltd., Niigata (JP)

( * ) Notice: Subject to any disclaimer, the term of this patent is extended or adjusted under 35 U.S.C. 154(b) by 231 days.

(21) Appl. No.: 13/258,169

(22) PCT Filed: Jan. 27, 2011

(86) PCT No.: PCT/JP2011/051593
§ 371 (c)(1),
(2), (4) Date: Sep. 21, 2011

(87) PCT Pub. No.: WO2011/096322
PCT Pub. Date: Aug. 11, 2011

(65) Prior Publication Data
US 2012/0013614 A1  Jan. 19, 2012

(30) Foreign Application Priority Data

Feb. 2, 2010 (JP) .................................. 2010-021530

(51) Int. Cl.
| | | |
|---|---|---|
| G06T 15/00 | (2011.01) | |
| H04N 13/00 | (2006.01) | |
| G03B 35/26 | (2006.01) | |
| G09G 3/00 | (2006.01) | |
| H04N 13/04 | (2006.01) | |
| G02B 27/26 | (2006.01) | |

(52) U.S. Cl.
CPC ............ *G03B 35/26* (2013.01); *H04N 13/0033* (2013.01); *H04N 13/0438* (2013.01); *G02B 27/26* (2013.01); *H04N 13/0434* (2013.01); *H04N 13/0497* (2013.01); *G09G 3/003* (2013.01)
USPC ................................ 348/52; 348/42; 345/419

(58) Field of Classification Search
USPC ........................................ 345/419; 348/42, 58
See application file for complete search history.

(56) References Cited

U.S. PATENT DOCUMENTS 5,321,509 A  *  6/1994  Kannegundla ................ 348/521
7,808,564 B2   10/2010  Tamura et al.
(Continued)

FOREIGN PATENT DOCUMENTS

| CN | 101183177 A | 5/2008 |
|---|---|---|
| JP | 10-63199 A | 3/1998 |

(Continued)

OTHER PUBLICATIONS

Korean Intellectual Property Office, Examination Report in Korean Patent Application 2011-7015237 (Sep. 10, 2012.

(Continued)

*Primary Examiner* — Sath V Perungavoor
*Assistant Examiner* — Jeffery Williams
(74) *Attorney, Agent, or Firm* — Leydig, Voit & Mayer, Ltd.

(57) ABSTRACT

A stereoscopic image display apparatus and method which reduce crosstalk and select either high resolution images or bright images. The stereoscopic image display apparatus includes first and second image forming areas, each area including multiple contiguous horizontal rows. The areas are alternately disposed in a liquid crystal display, and display right and left eye images on the first and second image forming areas, respectively. The display displays the images in a fixed manner or replaces or overwrites the image areas every time a frame is switched, and displays a frame image in which the right and left eye images are simultaneously displayed. When the first and second image forming areas are alternately replaced, according to the frame switching timing, the backlight is controlled to turn on and phase difference states of right and left eye glasses of polarized eyeglasses are alternately replaced.

12 Claims, 10 Drawing Sheets

(56) References Cited

U.S. PATENT DOCUMENTS

| | | |
|---|---|---|
| 8,363,096 B1 * | 1/2013 | Aguirre .......................... 348/57 |
| 2003/0034946 A1 * | 2/2003 | Liang et al. .................... 345/89 |
| 2003/0111639 A1 * | 6/2003 | Yumoto et al. ............. 252/299.2 |
| 2006/0192746 A1 * | 8/2006 | Ioki et al. ...................... 345/102 |
| 2006/0221444 A1 | 10/2006 | Fukaishi et al. |
| 2009/0080099 A1 * | 3/2009 | Tanimoto et al. ............. 359/893 |
| 2011/0216252 A1 * | 9/2011 | MacNaughton et al. ....... 349/15 |

FOREIGN PATENT DOCUMENTS

| | | |
|---|---|---|
| JP | 10-239641 A | 9/1998 |
| JP | 2006-284873 A | 10/2006 |
| JP | 2009-109968 A | 5/2009 |
| JP | 2010-239641 A | 10/2010 |
| JP | 2010-243705 A | 10/2010 |

OTHER PUBLICATIONS

The International Bureau of WIPO, International Preliminary Report on Patentability in International Application No. PCT/JP2011/051593 (Sep. 18, 2012).

Japanese Patent Office; International Search Report in International Patent Application PCT/JP2011/051593 (Apr. 19, 2011).

State Intellectual Property Office of the People's Republic of China; Office Action in Chinese Patent Application No. 201180001112.3 (May 9, 2014).

* cited by examiner

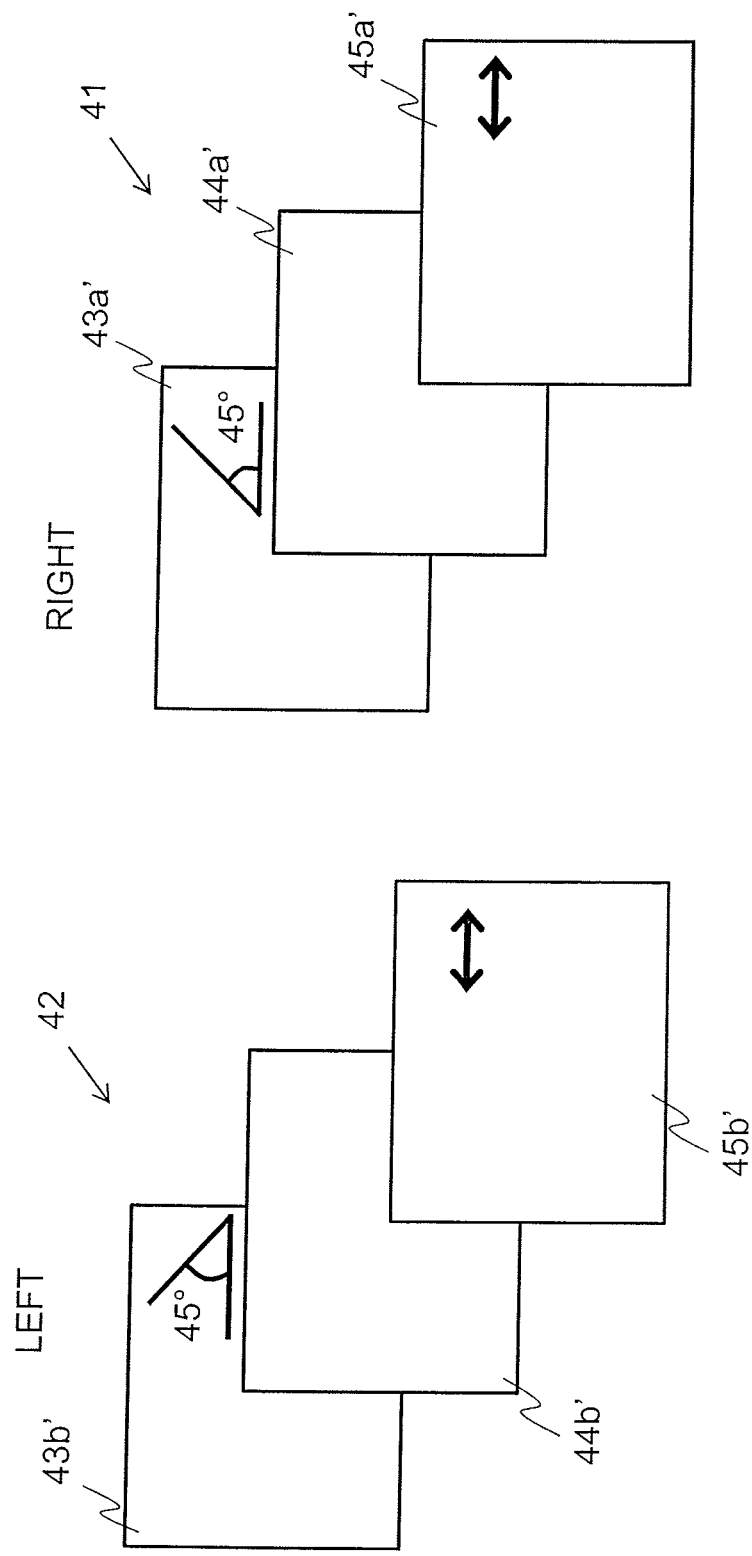

STEREOSCOPIC IMAGE DISPLAY APPARATUS AND METHOD

TECHNICAL FIELD

The present invention relates to a stereoscopic image display apparatus and method.

BACKGROUND ART

Recently, liquid crystal televisions using liquid crystal displays have been actively developed. Further, as an approach for achieving a higher function, development of a stereoscopic image display apparatus using a liquid crystal display is being advanced.

A plurality of types of schemes are proposed for this stereoscopic image display apparatus using the liquid crystal display apparatus. For example, a parallax barrier scheme, a lenticular lens scheme and a switch backlight scheme are known. Although these schemes provide an advantage that a viewer does not need dedicated glasses to view video images from a display apparatus, the parallax barrier scheme and the lenticular lens scheme have a problem that, the horizontal resolution is decreased and therefore the resolution of image display generally decreases. The switch backlight scheme has a problem in that flickering of images occur.

Further, as a scheme using dedicated glasses, a shutter glass scheme is known. This scheme provides an advantage of widening a display view angle of an image display apparatus without decreased resolution. However, this scheme has problems, such as, flickering of the display images, the brightness of a display screen is decreased, and there is a time lag between images visible to left and right eyes, therefore, natural images cannot be provided for a viewer.

Further, a stereoscopic image display apparatus is recently proposed which uses novel optical units to provide stereoscopic images. For example, Patent Literature 1 discloses a stereoscopic image display apparatus which does not require dedicated glasses by using two polarization filters which are such novel optical units.

With the stereoscopic image display apparatus disclosed in Patent Literature 1, a right eye polarization filter and a left eye polarization filter having the polarization directions orthogonal to each other are arranged in the front left and right of a light source. Further, respective lights transmitted through these filters are converted into substantially parallel lights by a Fresnel lens and are radiated to a liquid crystal display. Furthermore, linear polarization filter lines in which polarization directions are orthogonal to each other are alternately arranged per horizontal line of polarization filters on both surfaces of this liquid crystal display, and opposing linear polarization filter lines on the light source side and viewer side have polarization directions which are orthogonal. Still further, the liquid crystal panel of the liquid crystal display is configured to alternately display right eye video information and left eye video information per horizontal line according to transmittance lines of two polarization filters.

That is, all horizontal scan lines of a display screen are divided into odd lines and even lines and left eye and right eye images are displayed on respective lines to sort and display these left eye and right eye images for the left and right eyes of the viewer by means of novel optical units to display stereoscopic images.

This apparatus does not cause stereoscopic images to deteriorate even if a viewing position of a viewer is moved more or less to the left or right, and can avoid a phenomenon in which a horizontal resolution is decreased by half which is the problem of the parallax scheme and the lenticular lens scheme.

Further, Patent Literature 2 discloses a stereoscopic image display apparatus which uses novel retarders as novel optical units which are arranged in two different areas to oppose each other and which have two different areas which make polarizing axes of incident lights orthogonal to each other. This stereoscopic image display apparatus has a liquid crystal display which displays a right eye image and a left eye image on different areas, and retarders, and provides stereoscopic images by projecting parallax images toward the viewer. Further, this stereoscopic image display apparatus is known to display images of a high resolution at a wider view angle.

CITATION LIST

Patent Literature 1: Japanese Patent Application Laid-Open No. Hei 10-63199
Patent Literature 2: Japanese Patent Application Laid-Open No. 2006-284873

SUMMARY OF INVENTION

Technical Problem

However, the stereoscopic image display apparatus using polarization filters disclosed in Patent Literature 1 always has a fixed display position for a right eye video signal and a fixed display position for a left eye video signal on the display screen, and therefore has a new problem that vertical resolutions of left and right video images decrease by half.

Further, the stereoscopic image display apparatus using the novel retarders disclosed in Patent Literature 2 has a new problem that, when the viewer views the center in the vertical direction of the stereoscopic display apparatus from a position of a certain view angle, part of a right eye image on the liquid crystal display transmits through a left eye ½ wave plate and reaches the viewer's left eye, thereby causing crosstalk.

Hence, a stereoscopic image display apparatus is sought which can display high-quality stereoscopic images of a high resolution without flicker or crosstalk of the above type. Further, this stereoscopic image display of a high resolution is strongly sought in a situation where the brightness in the surrounding area is dim, for example, a dark room with one or a few viewers watching high-quality stereoscopic images.

By contrast with this, there is also a case where many viewers watch stereoscopic images in, for example, a bright room. In this case, the brightness of the screen needs to be increased according to the brightness in the surrounding environment instead of increasing the resolution of stereoscopic image display. In this case, the conventional stereoscopic image display apparatus disclosed in Patent Literature 1 is supposed to be applicable. However, the stereoscopic image display apparatus disclosed in Patent Literature 1 cannot support the above case where a few people watch stereoscopic images of a high resolution. That is, there is a problem still that high image quality cannot be realized even if high image quality display is demanded, and the purpose of use is very limited.

Hence, the conventional stereoscopic image display apparatus is not sufficient to cancel flicker and crosstalk, display stereoscopic images of a high resolution, and realize a high brightness in the screen, and therefore a new stereoscopic image display apparatus is sought.

Further, a new stereoscopic image display apparatus which satisfies this performance can preferably select appropriately to display stereoscopic images of a high resolution or display stereoscopic images of a higher brightness according to the purpose of use or surrounding environment, and can display stereoscopic images of desired image quality.

The present invention has been made in view of the above circumstances. That is, it is an object of the present invention to provide a stereoscopic image display apparatus which reduces crosstalk without flicker, which enables simultaneous view of left and right video images, which can display stereoscopic images of a high resolution, and display stereoscopic images of a high brightness.

Further, it is another object of the present invention to provide a method of appropriately selecting to display stereoscopic images of a high resolution, or display stereoscopic images of a high brightness according to the purpose of use or environment of use of the viewer, and display stereoscopic images using this stereoscopic image display apparatus.

Other challenges and advantages of the present invention are apparent from the following description.

Solution to Problem

A stereoscopic image display apparatus according to the first embodiment of the present invention, comprises:
a liquid crystal display which comprises a liquid crystal panel formed by aligning in a vertical direction a plurality of horizontal lines formed by aligning pixels in a horizontal direction, and a pair of polarizing plates which sandwich the liquid crystal panel; a backlight which is arranged on a back surface side of the liquid crystal display; an optical unit which is provided on a front surface side of the liquid crystal display; polarized glasses which a viewer wears; a controlling apparatus which controls image display in the liquid crystal display, turning on of the backlight, and phase difference states of the polarized glasses.

The liquid crystal display comprises a first image forming area and a second image forming area which are formed by binding the plurality of horizontal lines continuously arranged in the vertical direction of the liquid crystal panel and are alternately disposed, and in which, according to control by the controlling apparatus.

The first image forming area displays one of either a right eye image or a left eye image and the second image forming area simultaneously displays the other image, respectively, the first image forming area and the second image forming area are configured to
(1) replace a right eye image and a left eye image every time a frame is switched,
(2) in cases other than (1), replace a right eye image and a left eye image when a frame is switched or overwrite images displayed in a frame immediately before, or
(3) maintain a right eye image and a left eye image without replacing the right eye image and the left eye image.

A turn-on state of the backlight is controlled according to timing of replacement of the right eye image and the left eye image.

In the optical unit, a first polarizing area and a second polarizing area are arranged at positions and sizes corresponding to the first image forming area and the second image forming area, and one of either the first polarizing area or the second polarizing area forms a ½ wave plate or both of the first polarizing area and the second polarizing area form ¼ wave plates and comprise optical axes which are orthogonal to each other.

The polarized glasses comprise a right eye glass and a left eye glass, and are configured of replacement of phase difference states between the right eye glass and the left eye glass in synchronization with the timing of replacement of the right eye image and the left eye image.

A light blocking unit is preferably provided in at least part of a boundary between the first polarizing area and the second polarizing area of the optical unit.

The first image forming area and the second image forming area preferably each comprise 2 to 60 horizontal lines continuously arranged in the vertical direction of the liquid crystal panel.

The first image forming area and the second image forming area more preferably each comprise 3 to 30 horizontal lines continuously arranged in the vertical direction of the liquid crystal panel.

The polarized glasses preferably comprise an infrared ray sensor, the liquid crystal display comprises an infrared ray emitting apparatus, and when the infrared ray emitting apparatus emits infrared ray and the infrared ray sensor detects the infrared ray in synchronization with the timing at which the first image forming area and the second image forming area switch a right eye image and a left eye image, phase difference states are alternately replaced between the right eye glass and the left eye glass.

The right eye glass and the left eye glass are preferably formed using one of a TN type liquid crystal element and an STN type liquid crystal element.

The right eye glass and the left eye glass are preferably formed using one of a ferroelectric liquid crystal element and an antiferroelectric liquid crystal element.

The right eye glass and the left eye glass are preferably formed using one liquid crystal element selected from the group consisting of a VA type liquid crystal element, an OCB type liquid crystal element, an ECB type liquid crystal element of a homogeneous type and an ECB type liquid crystal element of a HAN type.

The liquid crystal display preferably switches frames at a cycle of at least 120 Hz.

The liquid crystal display ideally switches frames at a cycle of at least 240 Hz.

A stereoscopic image display method according to the second embodiment of the present invention, using: a liquid crystal display which comprises a liquid crystal panel formed by aligning in a vertical direction a plurality of horizontal lines formed by aligning pixels in a horizontal direction and in which a first image forming area and a second image forming area which are formed by binding the plurality of horizontal lines are alternately disposed; a backlight which is arranged on a back surface side of the liquid crystal display; an optical unit which is provided on a front surface side of the liquid crystal display, in which a first polarizing area and a second polarizing area are arranged at positions and sizes corresponding to the first image forming area and the second image forming area, and in which one of either the first polarizing area or the second polarizing area forms a ½ wave plate or both of the first polarizing area and the second polarizing area form ¼ wave plates and comprise optical axes which are orthogonal to each other; polarized glasses which comprise a right eye glass and a left eye glass having different phase difference states; and a controlling apparatus which controls image display in the liquid crystal display, turning on of the backlight, and the phase difference states of the polarized glasses; and displaying one of either a right eye image or a left eye image on the first image forming area, displaying the other image on the second image forming area, and simultaneously displaying the right eye image and the left eye image respectively on the first image forming area and the second image forming area for a viewer wearing the polarized glasses to view a stereoscopic image.

(1) a right eye image and a left eye image are maintained without replacing the right eye image and left eye image between the first image forming area and the second image forming area, (2) in cases other than (1), a right eye image and a left eye image when a frame is switched are replaced or an image displayed in a frame immediately before is overwritten, and, according to timing of replacement of the right eye image and the left eye image, a turn-on state of the backlight is controlled, and the phase difference states between the right eye glass and the left eye glass of the polarized glasses are controlled of replacement of.

The stereoscopic image display method of the present invention, wherein, in case of (2), an overwriting period of the right eye image and an overwriting period of the left eye image are preferably different in both of the first image forming area and the second image forming area.

Advantageous Effects of Invention

According to the first aspect of the present invention, a right eye image and a left eye image are simultaneously displayed on one screen and, even when areas to form a right eye image and a left eye image are replaced following switching of a frame, the viewer can view only right eye image light with the right eye and view only left eye image light with the left eye. Consequently, the viewer can recognize the right eye image light and left eye image light as stereoscopic images at all times.

Further, with a conventional stereoscopic image display apparatus, a vertical resolution is decreased by half and resolution thereby is decreased, whereas in the present embodiment the stereoscopic image display apparatus can display stereoscopic images at the full resolution without any decrease resolution.

Further, right eye and left eye images are displayed at all times, so that it is possible to alleviate fatigue of the viewer. Furthermore, it is also possible to provide an effect of canceling a sense of difference in a stereoscopic view resulting from misalignment between left and right images which occurs in case of fast moving stereoscopic images.

Further, areas to form a right eye image and a left eye image include a plurality of horizontal lines and a light blocking unit provided at a boundary of each area, so that crosstalk is reduced, in which part of a right eye image transmits through a left eye ½ wave plate and reaches the viewer's left eye when the viewer views the center in the vertical direction of the stereoscopic image display apparatus from the position of a certain viewing angle.

Further, according to the first aspect of the present invention, irrespectively of whether or not a frame is switched on the liquid crystal display, it is possible to continue displaying stereoscopic images as is without replacing image areas.

Consequently, in this case, a backlight need not be turned off to reduce crosstalk following replacement of image areas, so that it is possible to further increase the brightness of stereoscopic images.

Consequently, according to the first aspect of the present invention, the viewer can select to display stereoscopic images at a full resolution which fully utilize the capabilities of the liquid crystal display, or to display brighter stereoscopic images according to the environment of use, the purpose of use, or preference to display stereoscopic images.

According to the second aspect of the present invention, the viewer can select to display and watch stereoscopic images of a desired resolution, for example, the viewer can select to display stereoscopic images at a full resolution which fully utilize the capabilities of the liquid crystal display according to the environment of use, the purpose of use or preference, and form and watch stereoscopic images for which the brightness of display is selected according to the viewer's selection.

BRIEF DESCRIPTION OF DRAWINGS

FIGS. 6a and 6b are schematic exploded perspective views describing another configuration of polarized glasses where a right eye glass and a left eye glass are formed with a ferroelectric liquid crystal element.

DESCRIPTION OF EMBODIMENTS

Figure 1:
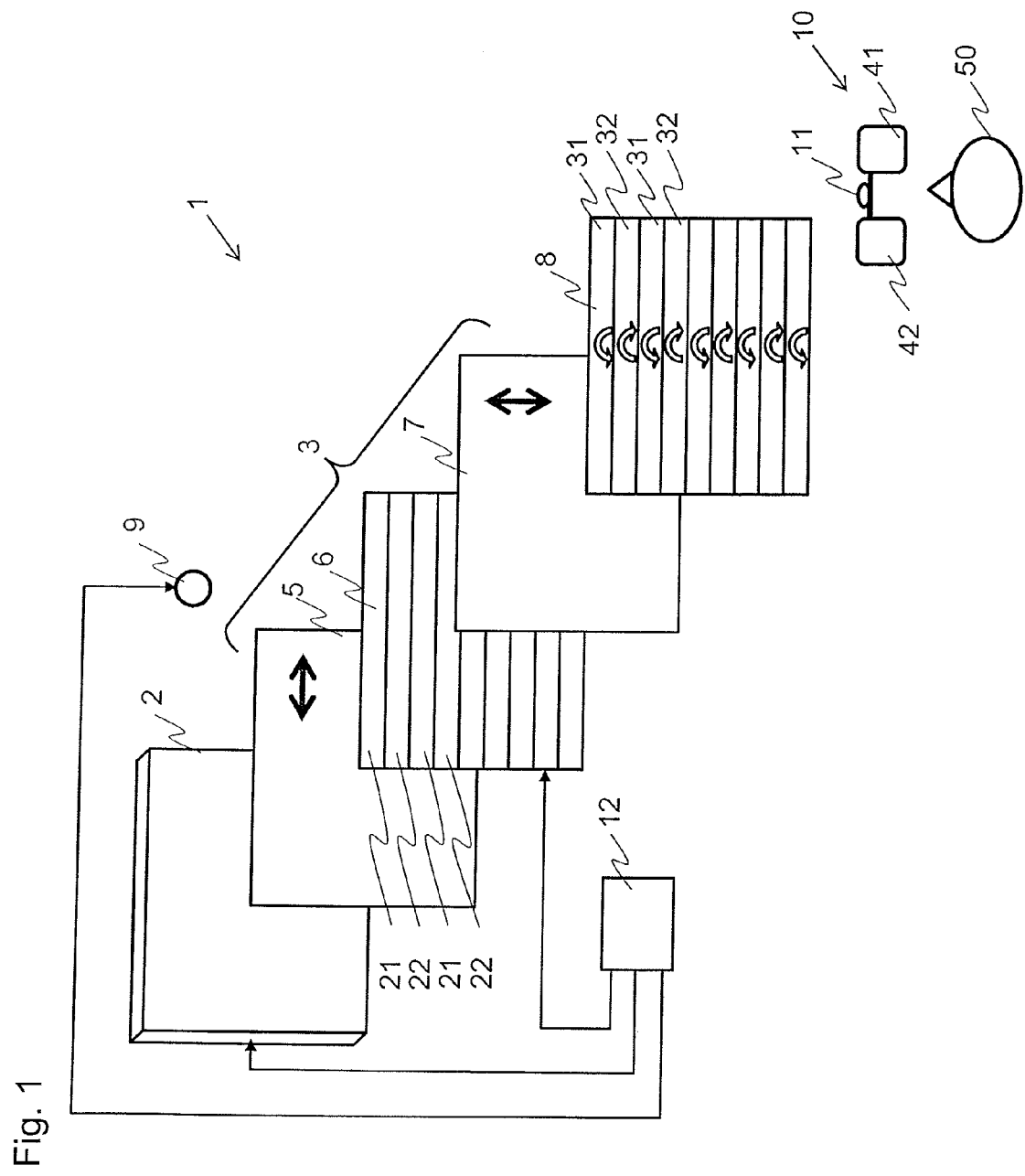
FIG. 1 is a schematic exploded perspective view describing a configuration of main parts of a stereoscopic image display apparatus according to the present embodiment.

FIG. 1 is a schematic exploded perspective view describing a configuration of main parts of a stereoscopic image display apparatus 1 according to the present embodiment. As shown in FIG. 1, the stereoscopic image display apparatus 1 has a backlight 2, a liquid crystal display 3, a retarder 8 of an optical unit, in this order, and these are accommodated in a housing (not shown). Further, the stereoscopic image display apparatus 1 includes polarized glasses 10, and a viewer 50 who views stereoscopic images wears these polarized glasses 10, and views images on the screen from the front side of the retarder 8.

In this case, although described later, the housing of the liquid crystal display 3 is provided with an infrared ray emitting apparatus 9, and the polarized glasses 10 are provided with an infrared ray sensor 11 which detects infrared ray emitted from this infrared ray emitting apparatus 9. Further, in the housing of the liquid crystal display 3, a controlling apparatus 12 is disposed which controls image display on the liquid crystal display 3, and the turn-on state of the backlight 2, particularly, the controlling apparatus 12 controls switching between the turn-on state and turn-off state and emission of infrared ray from the infrared ray emitting apparatus 9.

The backlight 2 is arranged in the farthest side of the stereoscopic image display apparatus 1 seen from the viewer 50, and emits non-polarized white light with a uniform light amount to one surface of a polarizing plate 5 in a state where the stereoscopic image display apparatus 1 displays images (hereinafter, "the state of use of the stereoscopic image display apparatus 1"). In addition, although a planar light source is used for the backlight 2 in the present embodiment, a combination of, for example, a point light source such as LED and a condensing lens may be used instead of the planar light source. An example of this condensing lens is a Fresnel lens sheet. The Fresnel lens sheet has on one side a lens surface which coaxially has a convexity and concavity, and can convert light incident from the focus in the center of the back side into substantially parallel light and emit light toward the front surface.

Figure 2:
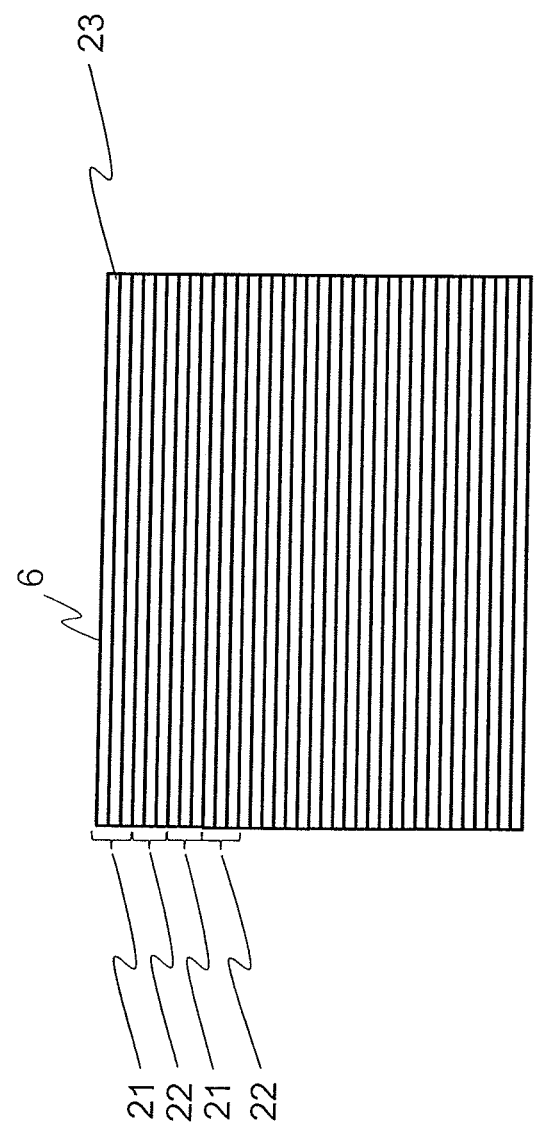
FIG. 2 is a schematic plan view of the liquid crystal panel forming the stereoscopic image display apparatus according to the present embodiment.

FIG. 2 is a schematic plan view of the liquid crystal panel 6 forming the stereoscopic image display apparatus 1 according to the present embodiment. As shown in FIG. 2, the liquid crystal display 3 is formed by sandwiching, by means of a pair of polarizing plate 5 and polarizing plate 7 as shown in FIG. 1, the liquid crystal panel 6 formed by aligning in the vertical direction a plurality of horizontal lines 23 formed by aligning pixels (not shown) in the horizontal direction.

As shown in FIG. 1, the polarizing plate 5 is disposed on the backlight 2 side in the liquid crystal panel 6 in the liquid crystal display 3. The polarizing plate 5 has a transmission axis and an absorption axis orthogonal to the transmission axis and, when non-polarized light emitted from the backlight 2 is incident on the polarizing plate, allows transmission of non-polarized light having the polarizing axis parallel to a transmission axis direction and blocks light having the polarizing axis parallel to the absorption axis direction. The direction of the polarizing axis refers to a vibration direction of the electric field of light, and the direction of the transmission axis in the polarizing plate 5 refers to a direction parallel to the horizontal direction in which the viewer 50 looks at the stereoscopic image display apparatus 1 as indicated by the arrow in FIG. 1.

The liquid crystal panel 6 is formed by sandwiching a liquid crystal by means of, glass substrates on which transparent electrodes made of ITO (Indium Tin Oxide) are disposed. Further, it is possible to use liquid crystal panels of a TN (Twisted Nematic) mode, IPS (In-Plane-Switching) mode or VA (Vertical Alignment) mode. With these liquid crystal panels, the orientation of a liquid crystal changes according to the voltage applied thereby enabling adjustment of the transmission light amount in combination with the functions of the polarizing plates 5 and 7 disposed on both surfaces of the liquid crystal panel 6.

Further, the liquid crystal panel 6 is an important component which forms images in the stereoscopic image display apparatus 1, and simultaneously displays a right eye image and a left eye image on one screen. Hereinafter, this configuration and function related to image display will be described.

First, the image display portion of the liquid crystal panel 6 is partitioned in the horizontal direction to provide first image forming areas 21 and second image forming areas 22. As shown in FIG. 1, the first image forming areas 21 and second image forming areas 22 mutually have the same area obtained by partitioning the liquid crystal panel 6 in a horizontal direction, and a plurality of first image forming areas 21 and second image forming areas 22 are alternately arranged in the vertical direction.

Further, as shown in FIG. 2, the first image forming areas 21 and the second image forming areas 22 of the liquid crystal panel 6 are each formed with a plurality of horizontal lines 23 continuously aligned in the vertical direction. In addition, with the liquid crystal panel 6 shown in FIG. 2, the first image forming areas 21 and the second image forming areas 22 are each formed with three continuously aligned horizontal lines 23.

As a result, the uppermost first horizontal line to the third horizontal line of the liquid crystal panel 6 are bound to form the first image forming area 21, the fourth horizontal line to the sixth horizontal line are bound to form the second image forming area 22, the seventh horizontal line to the ninth horizontal line are further bound to form the first image forming area 21, and the tenth horizontal line to the twelfth horizontal line are bound to form the second image forming area 22, and three each of the horizontal lines 23 are sequentially bound such that a plurality of first image forming areas 21 and second image forming areas 22 are alternately arranged in the liquid crystal panel 6.

Meanwhile, the number of horizontal lines 23 for forming the first image forming areas 21 and the second image forming areas 22 are not limited to three, and a plurality of horizontal lines 23 can form the first image forming areas 21 and the second image forming areas 22. For example, the number of horizontal lines 23 for forming the first image forming areas 21 and the second image forming areas 22 may be ten.

In this case, the uppermost first horizontal line to the tenth horizontal line in the liquid crystal panel 6 are bound to form the first image forming area 21, the eleventh horizontal line to the twentieth horizontal line are bound to form the second image forming area 22, the twenty-first horizontal line to the thirtieth horizontal line are further bound to form the first image forming area 21 and the thirty-first horizontal line to the fortieth horizontal line are bound to form the second image forming area 22, and ten each of horizontal lines 23 are sequentially bound such that a plurality of first image forming areas 21 and second image forming areas 22 are alternately arranged in the liquid crystal panel 6.

That is, as described later, from the viewpoint of reducing crosstalk and widening the view angle of the liquid crystal display 3, the number of horizontal lines 23 for forming the first image forming areas 21 and the second image forming areas 22 are selected.

Further, with the liquid crystal panel 6 of the liquid crystal display 3 of the stereoscopic image display apparatus 1, images are formed according to control by the controlling apparatus 12, when one frame image is displayed, a right eye image and a left eye image are displayed respectively on the first image forming areas 21 and the second image forming areas 22. Furthermore, according to the following methods described in (1) and (2), the right eye image and the left eye image are replaced between the first image forming areas 21 and the second image forming areas 22. Still further, according to a method described in (3), it is possible not of replacement of the right eye image and the left eye image.

(1) A right eye image and a left eye image are replaced every time a frame is switched.

(2) In cases other than (1), when a frame is switched, a right eye image and a left eye image are replaced or the images displayed in a frame immediately before are overwritten (following (3) is not included).

(3) The first image forming areas 21 and the second image forming areas 22 do not replace a right eye image and a left eye image, and maintain the right eye image and the left eye image.

In addition, although not shown in FIG. 1, an outer frame is arranged in the peripheral rim of the liquid crystal panel 6, and the first image forming areas 21 and the second image forming areas 22 in the liquid crystal panel 6 are supported by this outer frame 25.

As described above, in the state where the stereoscopic image display apparatus 1 is used, when one frame image is displayed, a right eye image and a left eye image are generated on the first image forming areas 21 and the second image forming areas 22 of the liquid crystal panel 6. When light transmitted through the polarizing plate 5 is incident on the first image forming areas 21 and the second image forming areas 22 of the liquid crystal panel 6, transmission light of the first image forming areas 21 becomes image light for the right eye image (hereinafter abbreviated as "right eye image light") and transmission light of the second image forming areas 22 becomes image light for the left eye image (hereinafter abbreviated as "left eye image light"). Further, in the case where image areas are replaced following switching of a frame according to control by the controlling apparatus 12, a left eye image and a right eye image are generated respectively on the first image forming areas 21 and the second image forming areas 22.

In addition, when one frame image is displayed as described above, right eye image light transmitted through the first image forming areas 21 and left eye image light transmitted through the second image forming areas 22 transmit through the polarizing plate 7 (described later), and become linear polarized lights having polarizing axes in respective specific directions. Meanwhile, the respective polarizing axes in respective directions may be mutually the same direction, and are the same direction as the direction of the transmission axis of the polarizing plate 7 (described later) as seen in FIG. 1.

The polarizing plate 7 is arranged on the viewer 50 side in the liquid crystal display 3. When right eye image light transmitted through the first image forming areas 21 and left eye image light transmitted through the second image forming areas 22 in the above case are incident on the polarizing plate 7, the polarizing plate 7 allows transmission of light of these lights having the polarizing axis parallel to the transmission axis and blocks light having the polarizing axis parallel to the absorption axis (vertical to the transmission axis). As indicated by the arrow in FIG. 1, the direction of the transmission axis in the polarizing plate 7 is a direction vertical to the horizontal direction when the viewer 50 looks at the stereoscopic image display apparatus 1.

The retarder 8 has first polarizing areas 31 and second polarizing areas 32. As shown in FIG. 1, the sizes and positions of the first polarizing areas 31 and the second polarizing areas 32 in the retarder 8 correspond to the positions and sizes of the first image forming areas 21 and the second image forming areas 22 in the liquid crystal panel 6.

Further, as described above, in the liquid crystal panel 6 forming the stereoscopic image display apparatus 1 according to the present embodiment shown in FIG. 2, three horizontal lines 23 for displaying images on the liquid crystal panel 6 are sequentially bound from the top in the vertical direction to form one set, as one example, and the first image forming areas 21 and the second image forming areas 22 having the same area are provided in association with the sets of the bound horizontal lines, respectively. Hence, as shown in FIG. 1, the positions and sizes of the first polarizing areas 31 and the second polarizing areas 32 in this retarder 8 correspond to the positions and sizes of the first image forming areas 21 and the second image forming areas 22 which are sets of three bound horizontal lines of the liquid crystal panel 6.

Accordingly, in the state where the stereoscopic image display apparatus 1 is used, when one frame image is displayed, right eye image light transmitted through the first image forming areas 21 in the above case is incident on the first polarizing areas 31, and left eye image light transmitted through the second image forming areas 22 in the above case is incident on the second polarizing areas 32. Further, in the case where image areas are replaced following switching of a frame according to control by the controlling apparatus 12, left eye image light transmitted through the first image forming areas 21 is incident on the first polarizing areas 31 and right eye image light transmitted through the second image forming areas 22 is incident on the second polarizing areas 32.

In addition, in the stereoscopic image display apparatus 1 according to the present embodiment, the first image forming areas 21 and the second image forming areas 22 can also be provided in association with each individual horizontal line for displaying images on the liquid crystal panel 6. In this case, also in the retarder 8, the first polarizing areas 31 and the second polarizing areas 32 are formed to correspond to the positions and sizes of the first image forming areas 21 and the second image forming areas 22 associated with each horizontal line 23 of the liquid crystal panel 6.

Further, it is possible to, display a right eye image and the left eye image on the first image forming areas 21 associated with odd horizontal lines of one frame image to be displayed and the second image forming areas 22 associated with even horizontal lines, alternately replace the horizontal lines for displaying the right eye image and the left eye image every time a frame is switched and display a frame image interlacing the right eye image and the left eye image respectively.

However, in this case, the problem of crosstalk becomes significant.

That is, there is a case where the viewer 50 views stereoscopic images on the stereoscopic image display apparatus 1 at a view angle from the center in the vertical direction of the liquid crystal display 3 forming the screen of the stereoscopic image display apparatus 1. Originally, when one frame image is displayed, only right eye image light transmitted through the first image forming areas 21 of the liquid crystal panel 6 needs to be incident on the first polarizing areas 31 of the retarder 8 and left eye image light transmitted through the second image forming areas 22 needs to be incident on the second polarizing areas 32. By contrast with this, when a large view angle is taken, part of right eye image light transmitted through the first image forming areas 21 of the liquid crystal panel 6 is incident on the second polarizing areas 32 on which only left eye image light needs to be incident and reaches the left eye of the viewer 50 as is together with the left eye image light.

This type of crosstalk occurs because the first polarizing areas 31 and the second polarizing areas 32 having different phase difference characteristics are provided to be adjacent to each other in the retarder 8.

That is, as described above, in the liquid crystal panel 6 of the stereoscopic image display apparatus 1 according to the present embodiment, for example, three horizontal lines 23 are sequentially bound from the top in the vertical direction to form one set, "set" is used for ease of description, and the first image forming areas 21 and the second image forming areas 22 having the same area are provided in association with sets of bound horizontal lines, respectively. Further, the first polarizing areas 31 and the second polarizing areas 32 of the retarder 8 are provided to be adjacent to each other to correspond to the first image forming areas 21 and the second image forming areas 22, and crosstalk is likely to occur when the viewer 50 views images on the screen at a certain view angle or more in the up and down directions of the screen of the stereoscopic image display apparatus 1.

This type of crosstalk occurs at boundary areas between the first polarizing areas 31 and the second polarizing areas 32 of the retarder 8 which are adjacent to each other. Hence, to reduce crosstalk, first of all, it is effective to reduce the boundary areas between the adjacent first polarizing areas 31 and second polarizing areas 32 in the retarder 8.

For example, when the liquid crystal panel 6 has 1080 horizontal lines according to the full HD (full high definition) specification, if the first image forming areas 21 and the second image forming areas 22 are provided in association with all horizontal lines respectively as described above, 540 first image forming areas 21 and 540 second image forming areas 22 are alternately provided. Further, the retarder 8 has 540 first polarizing areas 31 and 540 second polarizing areas 32 corresponding to the positions and sizes of the first image forming areas 21 and the second image forming areas 22 of the liquid crystal panel 6. As a result, 1079 boundary areas between the adjacent first polarizing areas 31 and second polarizing areas 32 are formed.

Further, when the viewer 50 views images on the screen of the stereoscopic image display apparatus 1 at a certain view angle, crosstalk occurs at each boundary area, and its strength becomes highest in the case where the first image forming areas 21 and the second image forming areas 22 are provided in association with all horizontal lines respectively as described above.

By contrast with this, as shown in FIGS. 1 and 2, when the first image forming areas 21 and the second image forming areas 22 of the liquid crystal panel 6 according to the present embodiment are formed with a plurality of horizontal lines 23, the first polarizing areas 31 and the second polarizing areas 32 are formed in the retarder 8 to correspond to the positions and sizes of the first image forming areas 21 and the second image forming areas 22 of the liquid crystal panel 6, and therefore these areas increase in proportion to the number of horizontal lines 23 to be bound as sets. As a result, it is possible to reduce the boundary areas between the adjacent first polarizing areas 31 and second polarizing areas 32 in the retarder 8.

That is, the boundary areas between the adjacent first polarizing areas 31 and second polarizing areas 32 which cause crosstalk are reduced, so that, when the viewer 50 views stereoscopic images at a certain view angle using the stereoscopic image display apparatus 1 according to the present embodiment, crosstalk occurring in the stereoscopic image display apparatus 1 is reduced as a whole. Consequently, in proportion to an increase in the number of horizontal lines 23 to be bound as sets to form the first image forming areas 21 and the second image forming areas 22 of the liquid crystal panel 6, crosstalk is more suppressed and the viewer 50 is less likely to sense crosstalk.

Accordingly, the stereoscopic image display apparatus 1 according to the present embodiment reduces crosstalk and expands a viewable angle of view, thereby improving the angle-of-view characteristics.

In view of the above, from the viewpoint of reducing crosstalk, the number of horizontal lines 23 to be bound as sets to form the first image forming areas 21 and the second image forming areas 22 of the liquid crystal panel 6 is preferably greater.

Figure 3:
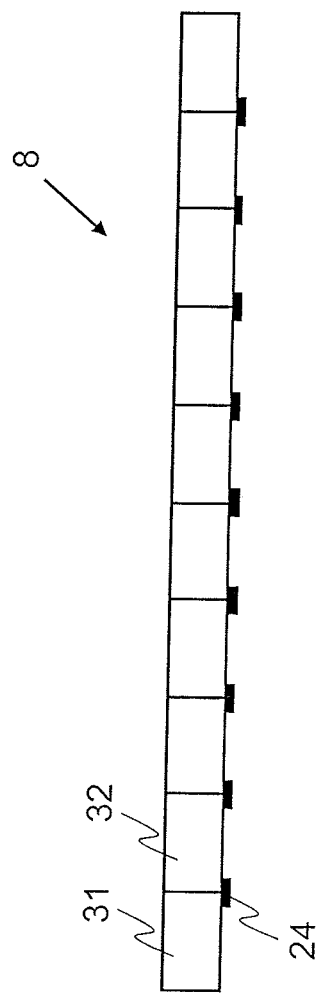
FIG. 3 is a schematic sectional view of the retarder used in the stereoscopic image display apparatus according to the present embodiment.

Further, in the boundary areas between the first polarizing areas 31 and the second polarizing areas 32 in the surface of the retarder 8 opposing to the liquid crystal display 3, light blocking units 24 can also be provided. This light blocking unit 24 preferably has a belt shape, and is provided in the boundary area between the first polarizing area 31 and the second polarizing area 32. FIG. 3 is a schematic sectional view of the retarder 8 used in the stereoscopic image display apparatus 1 according to the present embodiment.

By providing these light blocking units 24, it is possible to absorb and block image light which goes beyond boundary areas and is incident on the adjacent first polarizing areas 31 among right eye image light or left eye image light which needs to be incident on the second polarizing areas 32 adjacent to the first polarizing areas 31 of the retarder 8.

Similarly, by providing these light blocking units 24, it is possible to absorb and block image light which goes beyond the boundary areas and is incident on the adjacent second polarizing areas 32 among right eye image light or left eye image light which needs to be incident on the first polarizing areas 31 adjacent to the second polarizing areas 32 of the retarder 8. Consequently, by providing the light blocking units in the retarder 8, it is possible to make crosstalk less likely to occur between right eye image light and left eye image light emitted from the stereoscopic image display apparatus 1.

This light blocking unit 24 is preferably made of a material in which a filler component is dispersed in binder resin. For the filler component, metal particles and their oxides, or pigment and dye are used. The color hue of the filler component is preferably black with respect to the above right eye image light and left eye image light. For the binder resin in which the above pigment and dye are dispersed or dissolved, a common resin such as acrylic resin, urethane resin, polyester, novolac resin, polyimide, epoxy resin, vinyl chloride-vinyl acetate copolymer, cellulose nitrate, or combinations thereof can be used.

Figure 4:
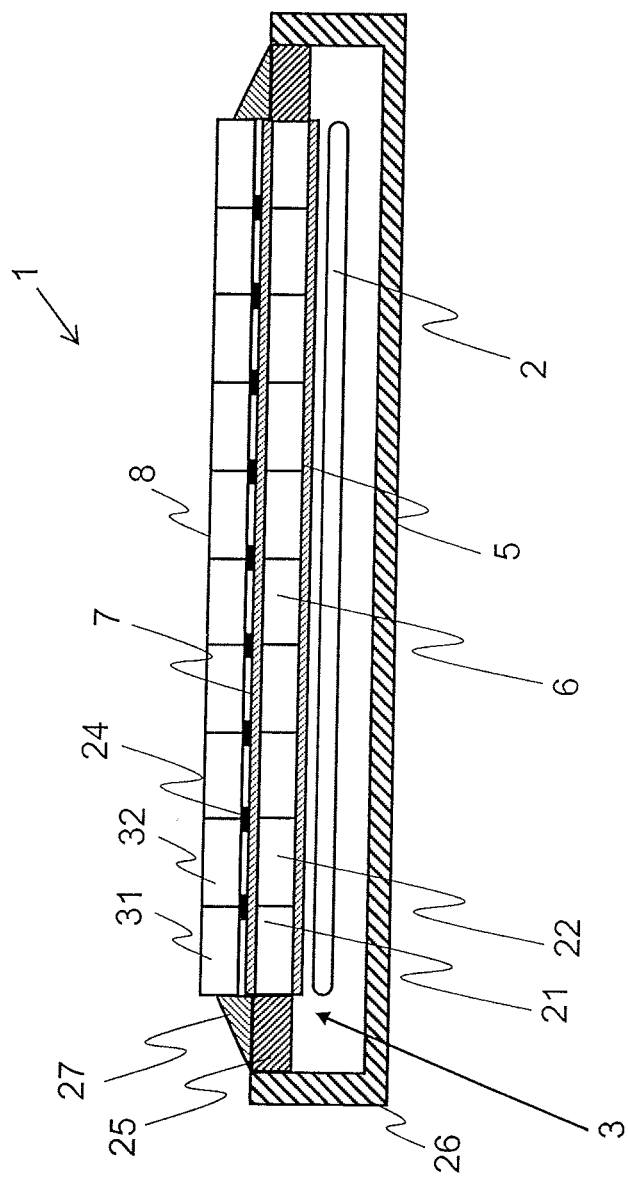
FIG. 4 is a schematic sectional view of the stereoscopic image display apparatus according to the present embodiment.

Further, FIG. 4 is a schematic sectional view of the stereoscopic image display apparatus 1 according to the present embodiment.

The liquid crystal display 3 and the retarder 8 are overlaid in the stereoscopic image display apparatus 1 according to the present embodiment, and the surface of the retarder 8 on which the light blocking units 24 are provided is arranged to oppose to the liquid crystal display 3.

As shown in FIG. 4, in a state where the polarizing plate 5 and the polarizing plate 7 are respectively attached to both surfaces of the liquid crystal panel 6 in the peripheral rim of which the outer frame 25 is placed in advance, the liquid crystal display 3 is attached to the housing 26 one face of which is open. Further, the surface to which the polarizing plate 7 is attached is exposed to the outside from the open face of the housing 26. The housing 26 is made of, for example, plastic or stainless steel, and the backlight 2 is fixed to the inner side of the surface opposing to the open face.

The retarder 8 and the liquid crystal display 3 are arranged as described above in the stereoscopic image display apparatus 1, and thus the surface of the liquid crystal display 3 on which the polarizing plate 7 is attached is opposed to the surface of the retarder 8 on which the light blocking units 24 are provided. Further, the liquid crystal display 3 and the retarder 8 are positioned in respective planar directions such that the first polarizing areas 31 and the second polarizing areas 32 of the retarder 8 respectively oppose to the first image forming areas 21 and the second image forming areas 22 of the liquid crystal panel 6, and the opposing surfaces of the liquid crystal display 3 and the retarder 8 abut each other.

Further, the outer frame 25 which is a peripheral rim of the liquid crystal panel 6 and the lateral surfaces of the retarder 8 are adhered by an adhesive 27. With this configuration, crosstalk is not likely to occur when the stereoscopic image display apparatus 1 is used. In addition, a diffusing plate or anti-reflection film may further be attached to the surface of the retarder 8 which is exposed to the outside.

However, the light blocking units 24 still function to block part of image light transmitting through the liquid crystal display 3 and reaching the eyes of the viewer 50. That is, although the light blocking units 24 are effective to reduce crosstalk, the screen brightness in image display in the stereoscopic image display apparatus 1 is decreased.

As described above, when the first image forming areas 21 and the second image forming areas 22 are provided in association with all horizontal lines respectively, the number of boundary areas between the adjacent first polarizing areas 31 and second polarizing areas 32 is the greatest, and the number of belt-shaped light blocking units 24 which need to be formed for respective boundary areas is the greatest. As a result, the decrease in brightness due to formation of the light blocking units 24 becomes the most significant.

Accordingly, although the light blocking units 24 are formed to effectively reduce crosstalk, the number of light blocking units 24 to be formed is preferably as small as possible.

In this case, as shown in FIGS. 1 and 2, when the number of horizontal lines 23 for forming the first image forming areas 21 and the second image forming areas 22 of the liquid crystal panel 6 is plural, the first polarizing areas 31 and the second polarizing areas 32 are formed in the retarder 8 to correspond to the positions and the sizes of the first image forming areas 21 and the second image forming areas 22 of the liquid crystal panel 6, and these areas increase in proportion to the number of horizontal lines 23 to be bound as sets in the liquid crystal panel 6. Consequently, it is possible to reduce the boundary areas between the adjacent first polarizing areas 31 and second polarizing areas 32 in the retarder 8, so that the number of light blocking units 24 formed in the boundary areas is decreased.

As a result, when the viewer 50 views stereoscopic images using the stereoscopic image display apparatus 1 according to the present embodiment, in proportion to an increase in the number of horizontal lines 23 to be bound as sets to form the first image forming areas 21 and the second image forming areas 22 of the liquid crystal panel 6, a decrease in the brightness of the screen due to the light blocking units 24 is suppressed, so that the viewer 50 can have stereoscopic images of a high brightness.

According to the above result, from the viewpoint of reducing crosstalk and suppressing a decrease in brightness in the screen of the stereoscopic image display apparatus 1, the number of horizontal lines 23 to be bound as sets to form the first image forming areas 21 and the second image forming areas 22 of the liquid crystal panel 6 is preferably plural, and moreover, the number of horizontal lines 23 to be bound as sets is preferably increased as much as possible.

Further, to correspond to the positions and sizes of a plurality of horizontal lines 23 to be bound as sets to form the first image forming areas 21 and the second image forming areas 22 of the liquid crystal panel 6, greater first polarizing areas 31 and greater second polarizing areas 32 of a retarder 8 are preferably formed to correspond to the first and second image forming areas 21 and 22.

However, infinitely increasing the number of horizontal lines 23 to be bound as sets to form the first image forming areas 21 and the second image forming areas 22 of the liquid crystal panel 6 causes the same known problem as the above-described conventional stereoscopic image display apparatus. That is, the conventional stereoscopic image display apparatus of a shutter glass scheme has the problem that flicker of images on the screen occur, the brightness on the display screen is decreased and a time lag occurs between images visible to the left and right eyes, and therefore natural images cannot be acquired for the viewer and these same problems can become apparent in the present apparatus.

Accordingly, in the stereoscopic image display apparatus 1 according to the present embodiment, the number of horizontal lines 23 to be bound as sets to form the first image forming areas 21 and the second image forming areas 22 of the liquid crystal panel 6 is preferably selected from the viewpoint of reducing crosstalk and suppressing a decrease in the brightness of the screen and the viewpoint of suppressing flicker and enabling natural stereoscopic images for the viewer 50, therefore, the first polarizing areas 31 and the second polarizing areas 32 of the retarder 8 are preferably formed according to the number of horizontal lines 23.

Further, based on a result of study, the first image forming areas 21 and the second image forming areas 22 of the liquid crystal panel 6 are each preferably formed with two to sixty horizontal lines 23 continuously aligned in the vertical direction of the liquid crystal panel 6.

Further, it is found that the first image forming areas 21 and the second image forming areas 22 of the liquid crystal panel 6 are more preferably formed with three to thirty horizontal lines 23 continuously aligned in the vertical direction of the liquid crystal panel 6, and are most preferably formed with five to fifteen horizontal lines 23. Furthermore, it is naturally preferable to form the first polarizing areas 31 and the second polarizing areas 32 of the retarder 8 at the positions and sizes corresponding to the first image forming areas 21 and the second image forming areas 22.

Next, as shown in FIG. 1, although right eye or left eye image light is incident on the first polarizing areas 31 of the above retarder 8 as linear polarized light having the polarizing axis in the direction vertical to the horizontal direction, this incident right eye or left eye image light is emitted as counterclockwise circular polarized light. Further, the second polarizing areas 32 emit the incident left eye or right eye image light as clockwise circular polarized light.

Accordingly, right eye or left eye image light transmitted through the first polarizing areas 31 and corresponding left eye or right eye image light transmitted through the second polarizing areas 32 become circular polarized lights with the rotation directions opposite to each other as indicated by the arrow shown in FIG. 1. In addition, the arrow in the retarder 8 in FIG. 1 schematically indicates the rotation direction of polarized light transmitted through this retarder 8.

Further, a ¼ wave plate having the optical axis in a direction of the upper right at 45 degrees from the horizontal direction is used for the first polarizing areas 31 forming the retarder 8, and a ¼ wave plate having the optical axis in a direction of the upper left at 45 degrees from the horizontal direction is used for the second polarizing areas 32. Meanwhile, the optical axis refers to one of the fast axis or slow axis when light transmits through the first polarizing areas 31 or the second polarizing areas 32.

In addition, retarders can be formed not only with ¼ retarders having optical axes orthogonal to each other as described above, but also using for the first polarizing areas a ½ wave plate having the optical axis in a direction of the upper right at 45 degrees from the horizontal direction and using for the second polarizing areas a member such as glass or resin having substantially no phase difference.

In this case, compared to image light which is incident linear polarized light, image light emitted from retarders becomes linear polarized light having the optical axis rotated 90 degrees, or linear polarized light having the optical axis which is not rotated according to the areas of the retarders through which the image light transmits. Hence, by appropriately forming a right eye glass and a left eye glass of the polarized glasses with a liquid crystal element and polarizing plate as described later, it is possible to selectively allow transmission of or block these image lights and form the stereoscopic image display apparatus having the same functions as described above.

Further, the above stereoscopic image display apparatus 1 may have a diffusing plate which diffuses right eye image light and left eye image light transmitted through the first polarizing areas 31 and the second polarizing areas 32 of the retarder 8 in at least one of the horizontal direction and vertical direction toward the viewer 50 beyond the retarder 8. For this diffusing plate, a lenticular lens sheet in which a plurality of D-shaped convex lenses (cylindrical lenses) which extend in, the horizontal direction or vertical direction are arranged, or a lens array sheet in which a plurality of convex lenses are arranged in a plane shape is used.

When the viewer 50 views stereoscopic images using the stereoscopic image display apparatus 1, the viewer 50 views right eye image light and left eye image light projected from the stereoscopic image display apparatus 1 wearing the polarized glasses 10. With these polarized glasses 10, a right eye glass 41 is arranged in the position corresponding to the right eye of the viewer 50 and a left eye glass 42 is arranged in the position corresponding to the left eye.

The right eye glass 41 and left eye glass 42 can be electrically driven, and are formed with a TN mode liquid crystal element or ferroelectric liquid crystal element having different initial orientation states from each other. Further, the right eye glass 41 and left eye glass 42 are fixed to the frame of the polarized glasses 10 together with a driving apparatus (not shown) of these liquid crystal elements.

In addition, the infrared ray sensor 11 is attached to the frame of the polarized glasses 10 as described above. Further, according to control by the controlling apparatus 12, by detecting infrared ray emitted from the infrared ray emitting apparatus 9 provided in the liquid crystal display 3 in synchronization with replacement of image areas following switching of a frame in the liquid crystal display 3, driving of the above liquid crystal elements forming the right eye glass 41 and the left eye glass 42 is controlled.

That is, with the liquid crystal display 3 and polarized glasses 10, according to control by the controlling apparatus 12 and in synchronization with replacement of image areas following switching of a frame in the liquid crystal display 3, the infrared ray emitting apparatus 9 provided in the liquid crystal panel 3 emits infrared ray which functions as a synchronization signal. Further, the infrared ray sensor 11 of the polarized glasses 10 receives this emitted infrared ray and, using this infrared ray as a synchronization signal, the polarized glasses 10 detect replacement of image areas following switching of a frame in the liquid crystal display 3. As a result, the above liquid crystal element forming the right eye glass 41 and the left eye glass 42 are started to be driven to support replacement of image areas following switching of a frame.

In addition, in the stereoscopic image display apparatus 1 according to the present embodiment, replacing image areas following switching of a frame in the liquid crystal display 3 and establishing synchronization with driving of the liquid crystal element forming the right eye glass 41 and the left eye glass 42 in the polarized glasses 10 are realized by the system having the infrared ray emitting apparatus 9 of the liquid crystal display 3 and the infrared ray sensor 11 of the polarized glasses 10.

In addition to the wireless system using infrared ray, the controlling apparatus 12 which controls driving of the liquid crystal display 3 and the driving apparatus for the right eye glass 41 and the left eye glass 42 of the polarized glasses 10 may be connected by wires, and driving of the right eye glass 41 and the left eye glass 42 may be controlled according to the command from the controlling apparatus 12 which controls driving of the liquid crystal display 3.

The right eye glass 41 and the left eye glass 42 forming the polarized glasses 10 are formed using a TN type liquid crystal element or ferroelectric liquid crystal element which can be electrically driven.

In addition, the right eye glass 41 and the left eye glass 42 forming the polarized glasses 10 can also be formed using a STN (Super Twisted Nematic) type liquid crystal element or antiferroelectric liquid crystal element which can be electrically driven. While the TN type liquid crystal element has about 90 degrees of the angle of twist of the liquid crystal, the STN type liquid crystal element has a larger degree of twist, approximately 270 degrees of an angle of twist of the liquid crystal and has improved sharpness of a rising operation of the liquid crystal. Further, the antiferroelectric liquid crystal element uses a liquid crystal of the antiferroelectric phase and can be operated at a very high speed.

Further, for the right eye glass 41 and the left eye glass 42 forming the polarized glasses 10, an ECB (Electrically Controlled Birefringence) type liquid crystal element or VA (Vertical Alignment) type liquid crystal element which can be electrically driven can also be used. Further, with the ECB type liquid crystal element, an ECB type liquid crystal element of a homogeneous type in which the initial orientation of the liquid crystal is a homogeneous orientation, and HAN (Hybrid-Aligned Nematic) type liquid crystal element in which the initial orientation is a hybrid orientation using a liquid crystal having negative dielectric anisotropy can also be used.

Figure 5B:
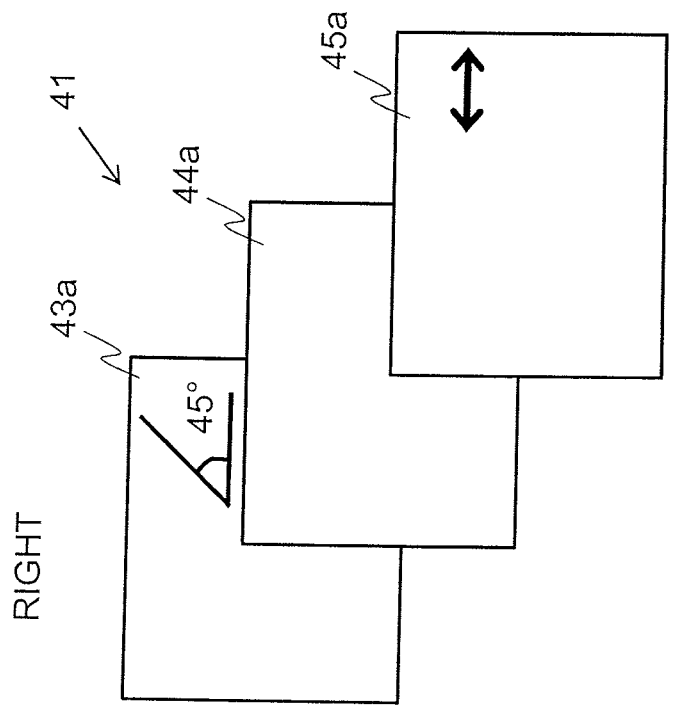
FIG. 5 is a schematic exploded perspective view describing a configuration of polarized glass for a right eye and polarized glass for a left eye.
Figure 5A:
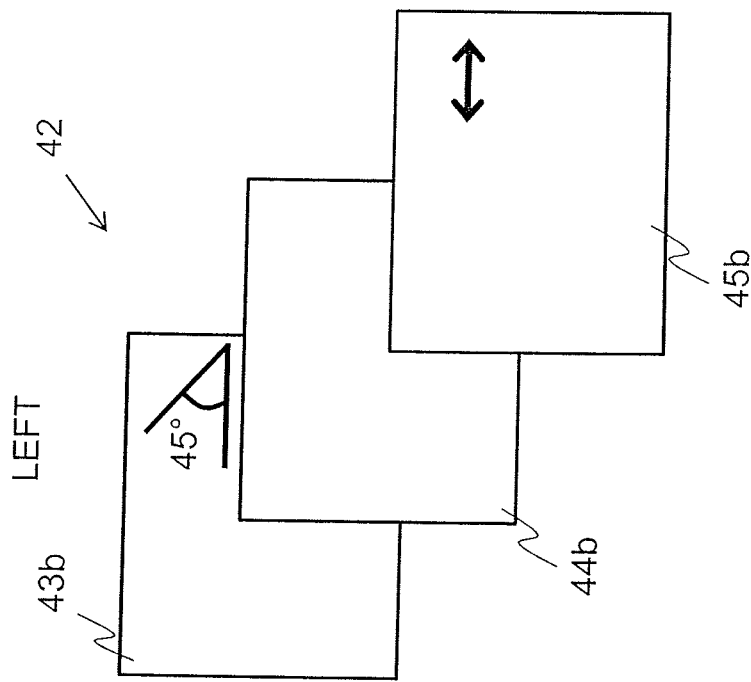

FIGS. 5a and 5b are schematic exploded perspective views describing a configuration when the right eye glass 41 and the left eye glass 42 are formed with the TN mode liquid crystal element.

The right eye glass 41 and the left eye glass 42 forming the polarized glasses 10 have ¼ wave plates 43a and 43b, TN liquid crystal cells 44a and 44b, and polarizing plates 45a and 45b respectively in this order, and these are fixed to the frame together with the driving apparatus (not shown).

In this case, with the polarized glasses 10 according to the present embodiment, when the viewer 50 faces the liquid crystal display 3 wearing the polarized glasses 10, the optical axis of the ¼ wave plate 43a of the right eye glass 41 is in a direction of the upper right at 45 degrees (the upper right at 45 degrees in the drawings) from the horizontal direction and the transmission axis of the polarizing plate 45a is in a direction parallel to the horizontal direction. Further, with the TN liquid crystal cell 44a, the initial orientation of the liquid crystal is formed such that, compared to linear polarized light which is incident when no voltage is applied, emission light is optically rotated 90 degrees counterclockwise. At this time, in the case where the polarized glasses 10 are driven by the above driving apparatus and placed in a so-called on state after the orientation of the liquid crystal changes, optical rotation of this TN liquid crystal cell 44a is lost, and incident light is emitted as linear polarized light without changing characteristics.

Further, the optical axis of the ¼ wave plate 43b of the left eye glass 42 is in a direction of the upper left at 45 degrees (the upper left at 45 degrees in the drawings) from the horizontal direction, and the transmission axis of the polarizing plate 45b is in a direction parallel to the horizontal direction. Further, with TN liquid crystal cell 44b, the initial orientation of the liquid crystal is formed such that, compared to linear polarized light which is incident when no voltage is applied, emission light is optically rotated 90 degrees clockwise. At this time, in the case where the polarized glasses 10 are driven by the above driving apparatus and placed in the so-called on state after the orientation of the liquid crystal changes, optical rotation of this TN liquid crystal cell 44a is lost, and incident light is emitted as linear polarized light without changing characteristics.

FIGS. 6a and 6b are schematic exploded perspective views describing a configuration of polarized glasses where a right eye glass 41' and a left eye glass 42' are formed with a ferroelectric liquid crystal element. The ferroelectric liquid crystal element forming the right eye glass 41' and the left eye glass 42' is a surface-stabilized ferroelectric liquid crystal element. The surface-stabilized ferroelectric liquid crystal element provides a fast response speed, and consequently, using the surface-stabilized ferroelectric liquid crystal element for the right eye glass 41' and the left eye glass 42' of the polarized glasses 10 is preferable to enable a smooth change of the orientation of the liquid crystal at a high speed following driving.

The right eye glass 41' and the left eye glass 42' which are another example of forming the polarized glasses have ¼ wave plates 43a' and 43b', ferroelectric liquid crystal cells 44a' and 44b' and polarizing plates 45a' and 45b' respectively in this order, and these are fixed to the frame together with the driving apparatus (not shown).

In this case, with the polarized glasses 10' according to the present embodiment, when the viewer 50 faces the liquid crystal display 3 wearing the polarized glasses, the optical axis of the ¼ wave plate 43a' of the right eye glass 41' is in a direction of the upper right at 45 degrees (the upper right at 45 degrees in the drawings) from the horizontal direction, and the transmission axis of the polarizing plate 45a' is in a direction parallel to the horizontal direction.

Further, with the ferroelectric liquid crystal cell 44a', the initial orientation of liquid crystal is formed such that the ferroelectric liquid crystal cell 44a' can be placed in two stable orientation states including the orientation state of the liquid crystal for emitting incident polarized light without changing characteristics and the orientation state for rotating and emitting linear polarized light 90 degrees counterclockwise. These two stable orientation states are selected by applying the voltage of an appropriate polarity to the ferroelectric liquid crystal cell 44a' from the above driving apparatus.

Further, the optical axis of the ¼ wave plate 43b' of the left eye glass 42' is in a direction of the upper left at 45 degrees (the upper left at 45 degrees in the drawings) from the horizontal direction, and the transmission axis of the polarizing plate 45b' is in a direction parallel to the horizontal direction.

Further, with the ferroelectric liquid crystal cell 44b', the initial orientation of liquid crystal is formed such that the ferroelectric liquid crystal cell 44b' can be placed in two stable orientation states including the orientation state of liquid crystal for emitting incident polarized light without changing characteristics and the orientation state for rotating and emitting linear polarized light 90 degrees clockwise. These two stable orientation states are selected by applying the voltage of an appropriate polarity to the ferroelectric liquid crystal cell 44b' from the above driving apparatus.

The configuration of the stereoscopic image display apparatus 1 according to the present embodiment has been described, and a method will be next described which makes the viewer 50 recognize stereoscopic images based on right eye image light and left eye image light using the stereoscopic image display apparatus 1 according to the present embodiment.

Figure 7A:
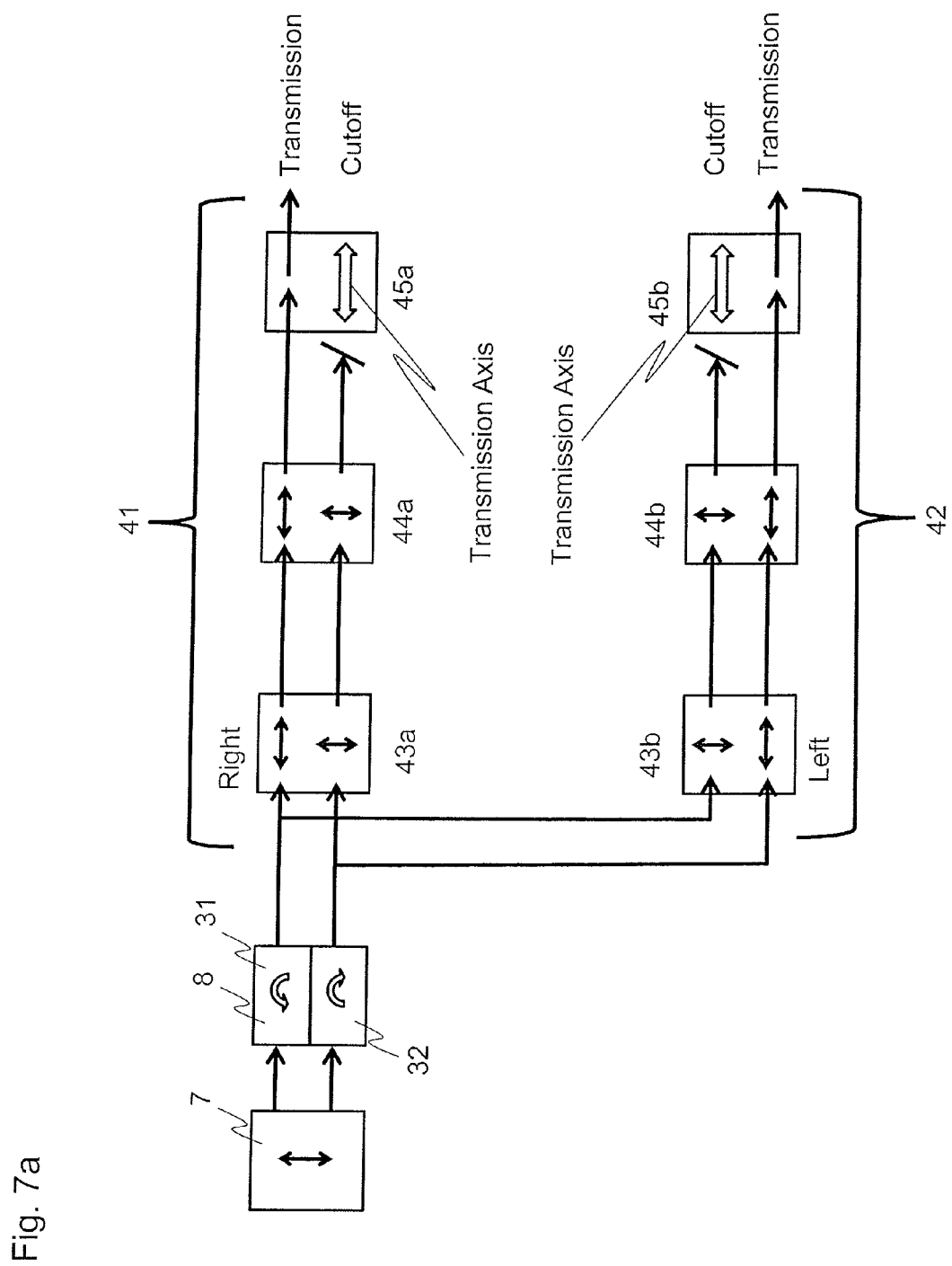
FIGS. 7a and 7b illustrate a method of making the viewer recognize stereoscopic images using the stereoscopic image display apparatus according to the present embodiment.
Figure 7B:
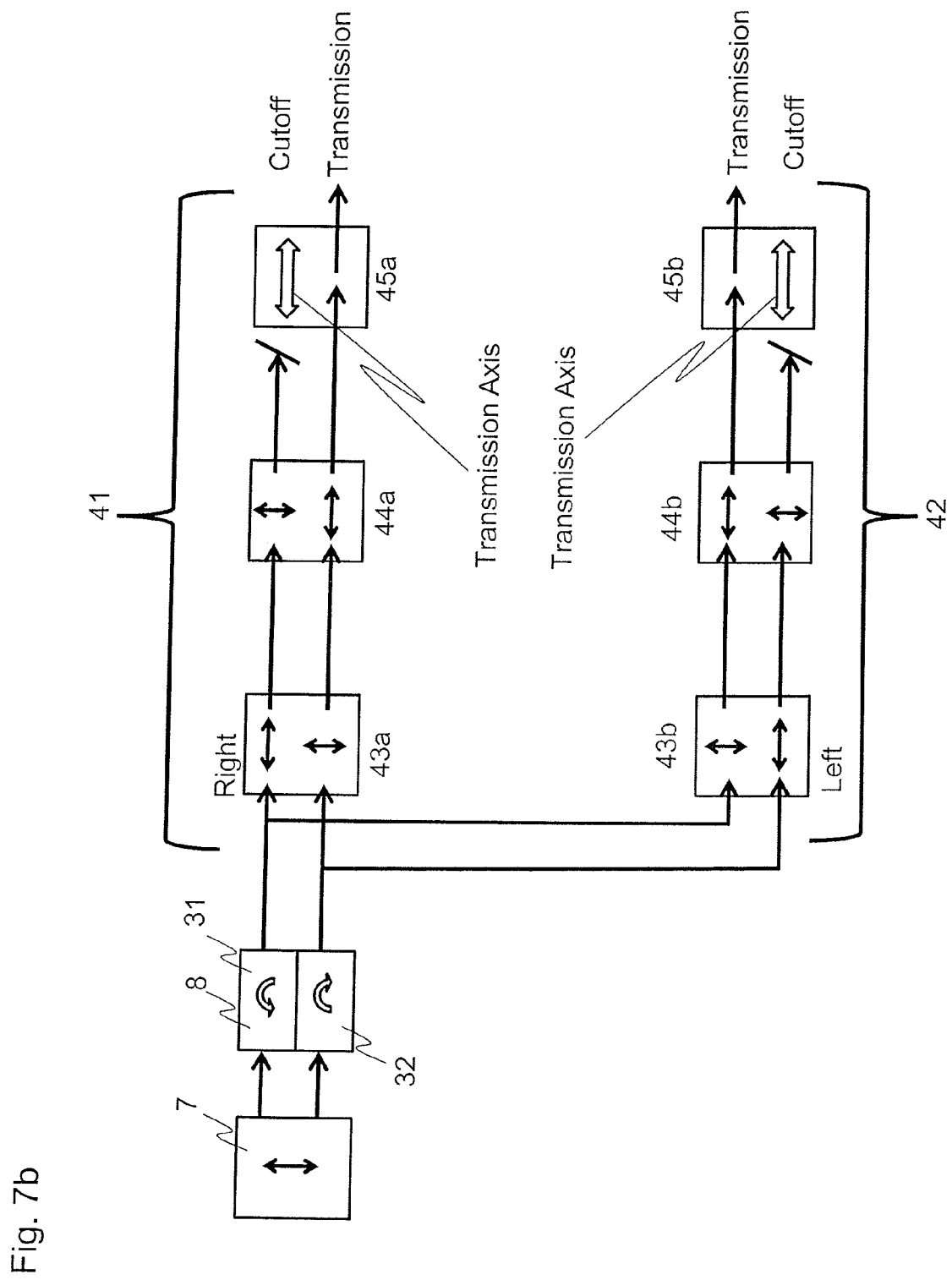

FIGS. 7a and 7b show a method of making the viewer recognize stereoscopic images using the stereoscopic image display apparatus 1 according to the present embodiment. FIG. 7a shows a method of making the viewer recognize a frame image, and FIG. 7b shows a method of making the viewer recognize a frame image replaced following switching of a frame.

When the viewer 50 views a stereoscopic image using the stereoscopic image display apparatus 1, a right eye image and a left eye image are respectively formed as described above in the corresponding first image forming areas 21 and second image forming areas 22 of the liquid crystal panel 6 upon display of one frame image.

Further, as indicated by the arrow in FIG. 7a, right eye image light transmitted through the first image forming areas 21 and left eye image light transmitted through the second image forming areas 22 transmit through the polarizing plate 7, and become linear polarized lights having polarizing axes in a direction vertical to the horizontal direction.

Further, although the right eye image light and the left eye image light are incident on the retarder 8, the right eye image light is incident on the first polarizing areas 31 of the retarder 8. Furthermore, as indicated by the arrow in FIG. 7a, this incident right eye image light is emitted as counterclockwise circular polarized light. Still further, as indicated by the arrow in FIG. 7(a), the second polarizing areas 32 emit incident left eye image light as clockwise circular polarized light.

Next, the right eye image light and the left eye image light obtained in this way are incident on the polarized glasses 10 which the viewer 50 wears.

When the polarized glasses 10 are formed with the right eye glass 41 and the left eye glass 42 using the TN mode liquid crystal element, the twisted state is canceled by applying an appropriate voltage to the TN liquid crystal cell to realize a state where a so-called on state is formed. In this case, the right eye image light which is counterclockwise circular polarized light transmits through the ¼ wave plate 43a provided in the right eye glass 41, is rotated and converted into linear polarized light parallel to the horizontal direction as indicated by the arrow in FIG. 7a, transmits through the TN liquid crystal cell 44a in the on state and the polarizing plate 45a as is and reaches the right eye of the viewer 50.

By contrast with this, when right eye image light which is counterclockwise circular polarized light is incident on the left eye glass 42, the right eye image light transmits through the ¼ wave plate 43b provided in the left eye glass 42 and is converted back to linear polarized light vertical to the horizontal direction as indicated by the arrow in FIG. 7a, transmits through the TN liquid crystal cell 44b in the on state and is incident on the polarizing plate 45b. However, the right eye image light cannot transmit through and is blocked by the polarizing plate 45b and does not reach the left eye of the viewer 50.

Further, the left eye image light which is clockwise circular polarized light transmits through the ¼ wave plate 43b provided in the left eye glass 42 and is converted into linear polarized light parallel to the horizontal direction, transmits through the TN liquid crystal cell 44b in the on state and the polarizing plate 45b as is and reaches the left eye of the viewer 50.

By contrast with this, when left eye image light which is clockwise circular polarized light is incident on the right eye glass 41, the left eye image light transmits through the ¼ wave plate 43a provided in the right eye glass 41 and is converted back to linear polarized light vertical to the horizontal direction, transmits through the TN liquid crystal cell 44a in the on state, is incident on but cannot transmit through and is blocked by the polarizing plate 45a, and does not reach the right eye of the viewer 50.

Thus, when the viewer 50 views the stereoscopic image display apparatus 1 wearing the polarized glasses 10 as described above in the range where right eye image light and left eye image light transmitted through the first polarizing areas 31 and the second polarizing areas 32 of the retarder 8 are emitted, the right eye can view only right eye image light and the left eye can view only left eye image light. Consequently, the viewer 50 can recognize these right eye image light and left eye image light as stereoscopic images.

Next, a case will be described where, as shown in FIG. 7b, when the viewer 50 views a stereoscopic image using the stereoscopic image display apparatus 1, image areas are replaced following switching of a frame as described above, and a left eye image and a right eye image are formed respectively on the first image forming areas 21 and the second image forming areas 22 in the liquid crystal panel 6.

Similar to the above case, left eye image light transmitted through the first image forming areas 21 in the liquid crystal panel 6 and right eye image light transmitted through the second image forming areas 22 transmit through a polarizing plate 7 (described later) as indicated by the arrow in FIG. 7b, become linear polarized lights respectively having polarizing axes vertical to the horizontal direction.

Further, although the left eye image light and the right eye image light are incident on the retarder 8, the left eye image light is incident on the first polarizing areas 31 of the retarder 8. Further, as indicated by the arrow in FIG. 7b, this incident left eye image light is emitted as counterclockwise circular polarized light. Further, the second polarizing areas 32 emit incident right eye image light as clockwise circular polarized light.

Next, the left eye image light and the right eye image light acquired in this way are incident respectively on the polarized glasses 10 which the viewer 50 wears.

In this case, when the polarized glasses 10 are formed with the right eye glass 41 and the left eye glass 42 using the TN mode liquid crystal element, an initial orientation state which is a so-called off state is formed without applying the voltage to the TN liquid crystal cell.

As a result, when left eye image light which is counterclockwise circular polarized light is incident on the right eye glass 41, as indicated by the arrow in FIG. 7b, the left eye image light transmits through the ¼ wave plate 43a provided in the right eye glass 41 and is converted into linear polarized light parallel to the horizontal direction, is further rotated 90 degrees in the TN liquid crystal cell 44a in the off state and is converted into linear polarized light vertical to the horizontal direction, is incident on but cannot transmit through and is blocked by the polarizing plate 45a and does not reach the right eye of the viewer 50.

By contrast with this, left eye image light which is counterclockwise circular polarized light is incident on the left eye glass 42 and transmits through the ¼ wave plate 43b provided in the left eye glass 42, and is rotated and converted into linear polarized light vertical to the horizontal direction as indicated by the arrow in FIG. 7b. Further, in the TN liquid crystal cell 44b in the off state, the left eye image light is further rotated 90 degrees and is converted into linear polarized light parallel to the horizontal direction, transmits through the polarizing plate 45b as is and reaches the left eye of the viewer 50.

Further, as indicated by the arrow in FIG. 7b, right eye image light which is clockwise circular polarized light transmits through the ¼ wave plate 43a provided in the right eye glass 41 and is converted back to linear polarized light vertical to the horizontal direction. Further, the right eye image light is rotated 90 degrees in the TN liquid crystal cell 44a in the off state and is converted into linear polarized light parallel to the horizontal direction, transmits through the polarizing plate 45a as is and reaches the right eye of the viewer 50.

By contrast with this, when right eye image light which is clockwise circular polarized light is incident on the left eye glass 42, as indicated by the arrow in FIG. 7b, the right eye image light transmits through the ¼ wave plate 43b provided in the left eye glass 42 and is rotated and converted into linear polarized light parallel to the horizontal direction. Further, the right eye image light is further rotated 90 degrees in the TN liquid crystal cell 44b in the off state, is converted into linear polarized light vertical to the horizontal direction, is incident on but cannot transmit through and is blocked by the polarizing plate 45b and does not reach the left eye of the viewer 50.

Thus, the viewer 50 wears the polarized glasses 10 configured to alternately replace phase difference states between the left and right in synchronization with replacement of image areas following switching of a frame in the liquid crystal display 3, according to control by the controlling apparatus 12 in order to view the stereoscopic image display apparatus 1 within a range where left eye image light and right eye image light transmitted through the first polarizing areas 31 and the second polarizing areas 32 of the retarder 8 are emitted. As a result, even if image areas to form right eye and left eye images are replaced following switching of a frame, the right eye can view only the right eye image light and the left eye can view only the left eye image light. Consequently, the viewer 50 can recognize the right eye image light and left eye image light as stereoscopic images at all times.

Accordingly, with a conventional stereoscopic image display apparatus, image areas to form right eye and left eye images are fixed, and therefore the vertical resolution is, reduced and the resolution is thereby reduced, whereas the stereoscopic image display apparatus 1 according to the present embodiment enables display at the full resolution which fully utilize the capabilities of the liquid crystal display 3 without decreasing the resolution at all.

Further, with a conventional stereoscopic image display apparatus, there are cases where only one of left eye and right eye images is displayed at all times, and there is a time lag to recognize the three dimension, whereas the stereoscopic image display apparatus 1 according to the present embodiment displays left eye and right eye images at all times, and can alleviate fatigue of the viewer. Further, the stereoscopic image display apparatus 1 also provides an effect of preventing a sense of difference in the stereoscopic view from being produced by misalignment of left and right images which occurs in the case of fast moving stereoscopic images.

Further, even if a response speed of a liquid crystal element used for a necessary liquid crystal display and polarized glasses is slow, this liquid crystal element can be used for the stereoscopic image display apparatus 1 according to the present embodiment. By contrast with this, when the response speed of the liquid crystal element is fast, it is possible to display stereoscopic images of a much higher brightness compared to a conventional stereoscopic image display apparatus.

Consequently, the stereoscopic image display apparatus 1 according to the present embodiment is suitable for the viewer 50 who wants to enjoy high-quality stereoscopic image display at a high resolution.

In addition, a case will be described where the polarized glasses 10 are formed with the right eye glass 41' and the left eye glasses 42' using the ferroelectric liquid crystal element in the stereoscopic image display apparatus 1 according to the present embodiment.

With the ferroelectric liquid crystal element, the orientation state of the liquid crystal among the above two stable selectable states for emitting incident linear polarized light without changing the characteristics can be utilized similar to the on state of the above TN mode liquid crystal element. Further, the orientation state where incident linear polarized light can be rotated 90 degrees counterclockwise or 90 degrees clockwise and emitted can be utilized similar to the off state of the above TN mode liquid crystal element.

That is, the ferroelectric liquid crystal element enables switching by being applied voltage, so that, by appropriately selecting two selectable stable orientation states which can be selected desirably, it is possible to provide the same light polarizing effect as the polarized glasses 10 formed using the TN mode liquid crystal element.

Consequently, even when the polarized glasses 10 are formed with the right eye glass 41' and the left eye glass 42' using the ferroelectric liquid crystal element, the viewer 50 views the stereoscopic image display apparatus 1 wearing the polarized glasses 10 as described above within the range where right eye image light and left eye image light transmitted through the first polarizing areas 31 and the second polarizing areas 32 of the retarder 8 are emitted, so that the right eye can view only the right eye image light and the left eye can view only the left eye image light. Consequently, the viewer 50 can recognize the right eye image light and left eye image light as stereoscopic images.

Further, in the situation of use where it is not necessary to provide display at the full resolution which fully utilize the capabilities of the above liquid crystal display 3, the stereoscopic image display apparatus 1 according to the present embodiment can display stereoscopic images on fixed image areas for forming right eye and left eye images without replacement of image areas which can be performed following switching of a frame in the liquid crystal display 3 according to control by the controlling apparatus 12.

That is, the stereoscopic image display apparatus 1 according to the present embodiment can select whether or not of replacement of image areas following switching of a frame in the liquid crystal display 3 according to a preference or purpose of use of the viewer, and can select to display stereoscopic images at a high resolution or to display bright stereoscopic images at a lower resolution than the high resolution as described below.

Further, when the stereoscopic image display apparatus 1 according to the present embodiment displays stereoscopic images on fixed image areas for forming right eye and left eye images as described above, the polarized glasses 10 do not perform an operation of alternately switching the phase difference states between the right eye glass 41 and the left eye glass 42, and maintain one phase difference state.

For example, when the polarized glasses 10 are formed with the right eye glass 41 and the left eye glass 42 using the TN mode liquid crystal element, a constant state, a so-called on state, is formed and maintained which overcomes a twisted state of the liquid crystal by applying an appropriate voltage to the TN liquid cell, so that a constant phase difference state is maintained.

Further, when the polarized glasses maintain a constant phase difference state, it is also possible to prepare and use other polarized glasses adopting a simpler structure formed by combining appropriate retarders and polarizing plates without using polarized glasses formed using a liquid crystal element.

That is, the stereoscopic image display apparatus 1 according to the present embodiment can display brighter stereoscopic images at a lower resolution without replacing image areas in the liquid crystal display 3. Further, in this case, the viewer 50 can watch stereoscopic images using light-weight polarized glasses of a high transmittance adopting a simpler structure the operation of which is not controlled by the controlling apparatus 12.

Next, the operation of the stereoscopic image display apparatus 1 according to the present embodiment will be described.

As described above, according to a scheme of simultaneously displaying a right eye image and a left eye image on one frame image and sorting the images to the left and right eyes of the viewer using retarders of the above optical units to display stereoscopic images, it is effective to first divide all horizontal scan lines continuously aligned in the vertical direction of the frame display screen, into the first image forming areas 21 and the second image forming areas 22 each formed with a plurality of horizontal lines in order to display all pieces of image information.

Further, using a method of simultaneously displaying one of either a right eye image or a left eye image on the first image forming areas 21 and the other image on the second image forming areas 22, replacing image forming areas for displaying the left eye image and the right eye image following switching of a frame at a predetermined cycle and, at the same time as the image forming areas are replaced, replacing polarization performance between the right eye glass 41 and the left eye glass 42 of the polarized glasses 10 is effective to display and watch all pieces of video information.

Figure 8:
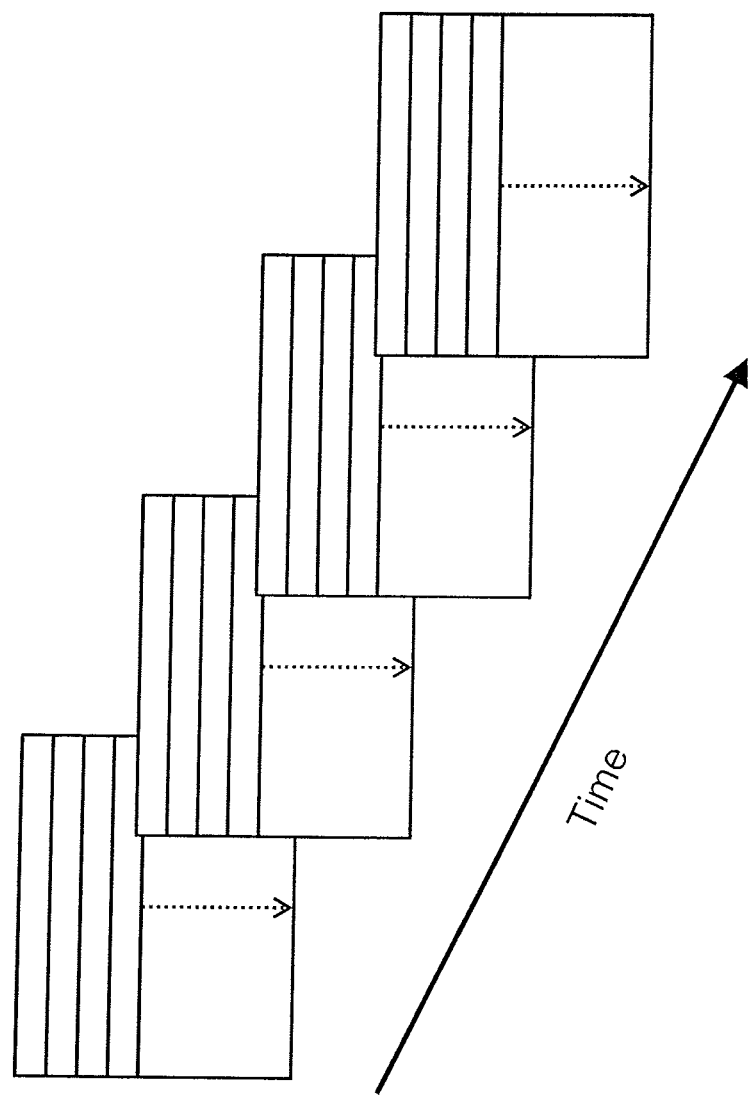
FIG. 8 is an explanatory drawing showing a method for displaying images in a liquid crystal display.

However, when the above liquid crystal display 3 is used, as shown in FIG. 8, information of a frame image is sequentially updated from the horizontal line at the top of the screen to the horizontal line at the bottom. Therefore, the viewer simultaneously views a previous image and the next new image at all times and, as a result, the stereoscopic image display apparatus 1 has a problem that crosstalk frequently occurs and the viewer has difficulty in recognizing stereoscopic images. Meanwhile, FIG. 8 is a view describing a display method of a general liquid crystal display.

To avoid this crosstalk the stereoscopic image display apparatus 1 according to the present embodiment introduces a flashing operation of the backlight 2 to reduce the above crosstalk.

Figure 9:
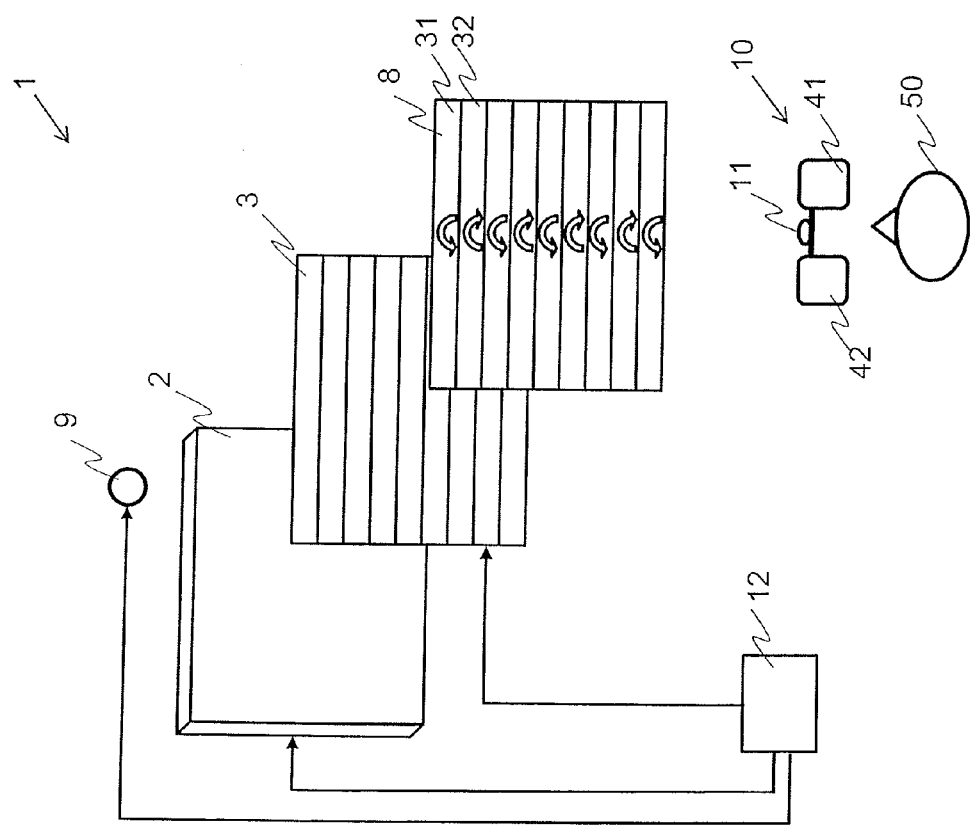
FIG. 9 is a view illustrating an operation of the stereoscopic image display apparatus according to the present embodiment.

FIG. 9 is a view illustrating an operation of the stereoscopic image display apparatus 1 according to the present embodiment.

As described above, the stereoscopic image display apparatus 1 according to the present embodiment has the backlight 2, the liquid crystal display 3 and the retarder 8 of optical unit in this order, and has the controlling apparatus 12. Further, the liquid crystal display 3 has an image outputting unit (not shown) having a function described below. In addition, these components are accommodated in the housing (not shown). Further, the stereoscopic image display apparatus 1 has the polarized glasses 10 which the viewer 50 uses to watch stereoscopic images.

The controlling apparatus 12 commands the image outputting unit of the liquid crystal display 3 to simultaneously output a right eye image and a left eye image on one frame image. Upon receiving this command, the image outputting unit of the liquid crystal display 3, outputs the right eye image and the left eye image respectively to be displayed on the first image forming areas 21 and second image forming areas 22 provided in association with a plurality of horizontal lines continuously aligned in the vertical direction of the liquid crystal panel 6 which forms the liquid crystal display 3 shown in FIG. 1.

Further, every time a frame is switched, the image outputting unit can replace image areas between the first image forming areas 21 and the second image forming areas 22 which display the right eye image and the left eye image, and display a frame image in which the right eye image and the left eye image are alternately arranged respectively. However, in order to prevent the above crosstalk, the controlling apparatus 12 commands the image outputting unit of the liquid crystal display 3 to simultaneously display the right eye image and the left eye image on one frame and then overwrite the images as is without replacing the image areas in the next frame to display the overwritten images on the liquid crystal display 3 in at least the next one frame period.

At this time, the controlling apparatus 12 simultaneously controls the backlight 2 to turn on and turn off and then control switching of the polarized states of the right eye glass 41 and the left eye glass 42 of the polarized glasses 10. That is, the backlight 2 is turned on in a period during which one frame image is displayed, and the backlight 2 is turned off in frames before and after that period, in which image forming areas displaying the right eye image and the left eye image are replaced or controlled to decrease the brightness appropriately. By so doing, it is possible to prevent residual images of the right eye image and the left eye image and the above crosstalk following switching of image areas from being sensed by the viewer 50.

Further, in synchronization with the start timing of a frame in which image forming areas which display a right eye image and a left eye image are replaced, the controlling apparatus 12 also commands the infrared ray emitting apparatus 9 provided in the housing of the liquid crystal display 3 to emit infrared ray of a synchronization signal to the infrared ray sensor 11 provided in the polarized glasses 10. Furthermore, when the infrared ray sensor 11 detects this emitted infrared ray, the TN liquid crystal cells 44a and 44b which form the right eye glass 41 and the left eye glass 42 of the polarized glass 10 are driven. That is, by driving and controlling the TN liquid crystal cells 44a and 44b to be placed in the on state or off state, switching of the polarized states of the right eye glass 41 and the left eye glass 42 of the polarized glasses 10 is controlled.

In this case, although the liquid crystal display 3 can simultaneously display a right eye image and a left eye image on one frame, and then overwrite the images as is without replacing the image areas in the next frame, the liquid crystal display 3 is controlled to further support switching of the polarized states of the right eye glass 41 and the left eye glass 42 of the polarized glass 10.

That is, in synchronization with the start timing of the frame in which image forming areas which display a right eye image and a left eye image are replaced, the polarized states of the right eye glass 41 and the left eye glass 42 of the polarized glass 10 are switched. Further, in subsequent frames in which the images are overwritten and the image areas are not replaced, the polarized states of the right eye glass 41 and the left eye glass 42 of the polarized glass 10 are not switched and are controlled by the controlling apparatus 12 to maintain the polarized state as is.

By so doing, even when areas which form right eye and left eye images are replaced at a predetermined cycle following switching of a frame, the viewer 50 can reliably view only right eye image light with the right eye and view only left eye image light with the left eye. Consequently, the viewer 50 can recognize the right eye image light and left eye image light as stereoscopic images at all times without sensing the above crosstalk resulting from replacement of image areas.

In addition, in the case where a right eye image and a left eye image are simultaneously displayed on one frame image, and then the images are overwritten without replacing image areas in the next frame as described above, the number of times to switch images decreases and smoothness of display images is lost at a common frame frequency of 60 Hz which can be adopted in the liquid crystal display 3. Further, the backlight 2 is flashed at a cycle of 30 Hz per frame, and therefore there is a concern that the viewer 50 senses this flashing and then can detect flicker resulting from the flashing.

Hence, it is preferable to increase the frame frequency in the liquid crystal display 3 controlled by the controlling apparatus 12 to, at least 120 Hz. By so doing, even when a right eye image and a left eye image are simultaneously displayed on one frame image and then overwritten as is without replacing image areas in the next frame, it is possible to form stereoscopic images matching the frame frequency of 60 Hz, the number of times to switch images increases and there is no concern that the viewer 50 senses flicker. Further, flicker resulting from flashing of the above backlight 2 is not sensed by the viewer 50. Consequently, the stereoscopic image display apparatus 1 according to the present embodiment provides natural display images.

In addition, with the stereoscopic image display apparatus 1 according to the present embodiment, it is possible to set the frame frequency to 240 Hz in the liquid crystal display 3 controlled by the controlling apparatus 12. In this case, the controlling apparatus 12 can control the liquid crystal display 3 according to a pattern of simultaneously displaying a right eye image and a left eye image on one frame image, overwriting the images as is without replacing image areas in the next frame, further replacing image areas in the subsequent frame and overwriting the images as is in the following frame. That is, according to a pattern of repeating replacing display areas of a right eye image and a left eye image in the liquid crystal display 3 and overwriting the images per frame in this order, the controlling apparatus 12 can control image formation.

When images are formed on the liquid crystal display 3 at such a cycle, a stereoscopic image matching the frame frequency of 120 Hz can be formed, the number of times to switch images increases and there is no concern that the viewer 50 senses flicker. Further, the backlight 2 is flashed at the cycle of 120 Hz. Furthermore, the polarized states of the right eye glass 41 and the left eye glass 42 of the polarized glasses 10 are not switched in a frame in which images are overwritten, and therefore the polarized states of the right eye glass 41 and the left eye glass 42 are switched at the cycle of 60 Hz. Consequently, by switching the polarized states of the right eye glass 41 and the left eye glass 42 of the polarized glasses 10, there is no concern that the viewer 50 senses flicker.

Further, when the frame frequency is 240 Hz in the liquid crystal display 3, the controlling apparatus 12 controls the liquid crystal display 3 to simultaneously display a right eye image and a left eye image on one frame image by switching a frame, and then overwrite images as is without replacing image areas in subsequent three frames, so that it is also possible to display the overwritten images on the liquid crystal display 3 in the next three frame periods and form stereoscopic images matching the frame frequency of 60 Hz.

In this case, the backlight 2 can be turned off for a $\frac{1}{240}$ second which is the first one frame period, and the backlight 2 can be turned on for $\frac{3}{240}$ seconds which are three frame periods in which the overwritten images are displayed. In this case, although, compared to the above pattern of repeating replacing display areas of a right eye image and a left eye image in the liquid crystal display 3 per frame and overwriting the images as is, the number of times of replacement of image areas decreases, it is possible to reduce the period in which the backlight 2 is turned off in proportion to the decrease. As a result, it is possible to further increase the brightness of stereoscopic images in the stereoscopic image display apparatus 1.

Further, in this case, the backlight 2 is flashed at the cycle of 60 Hz. Consequently, there is no concern that the viewer 50 senses flicker resulting from flashing of the backlight 2.

As described above, by increasing the frame frequency of the liquid crystal display 3 to 120 Hz or 240 Hz, the viewer 50 can enjoy natural and high-quality stereoscopic images.

Further, as described above, the controlling apparatus 12 controlling the stereoscopic image display apparatus 1 according to the present embodiment can display a right eye image and a left eye image respectively on the first image forming areas 21 and the second image forming areas 22 of one frame image displayed on the liquid crystal display 3, provide an appropriate overwriting period, then replace image forming areas which display the right eye image and the left eye image, between the first image forming areas 21 and the second image forming areas 22 and display a frame image in which the right eye image and the left eye image are alternately arranged respectively.

However, irrespectively of switching of a frame in the liquid crystal display 3, the stereoscopic image display apparatus 1 according to the present embodiment can also display a right eye image and a left eye image respectively on the first image forming areas 21 and the second image forming areas 22 in a fixed manner and continue displaying stereoscopic images as is without replacing image areas.

In this case, although an increase in resolution of image display cannot be expected following replacement of image areas, it is not necessary to turn off the backlight 2 for a crosstalk countermeasure, and it is possible to increase the brightness of a stereoscopic image in the stereoscopic image display apparatus 1.

As a result, this is suitable in the situation of use where images of a high brightness are expected and need not be displayed at a high resolution. Further, when such an image display method is adopted, it is possible to use light-weight and comfortable polarized glasses of a simpler configuration as described above. Therefore, particularly in a bright room, this image display method is preferable in the case where many people want to watch stereoscopic images.

Accordingly, the viewer 50 gives a command to the controlling apparatus 12 according to the environment of use, the purpose of use or preference as to performing control, so that the stereoscopic image display apparatus 1 according to the present embodiment can select to display stereoscopic images at the full resolution which fully utilize the capabilities of the liquid crystal display 3 by replacing image areas following switching of a frame or display brighter stereoscopic images of a low resolution without replacing image areas.

That is, the stereoscopic image display apparatus 1 according to the present embodiment can implement the image display method of selecting image quality of stereoscopic images according to the environment of use, the purpose of use or preference of the viewer 50.

Further, the controlling apparatus 12 controlling the stereoscopic image display apparatus 1 according to the present embodiment displays a right eye image and a left eye image respectively on the first image forming areas 21 and the second image forming areas 22 of one frame image displayed on the liquid crystal display 3, provides an appropriate overwriting period and then alternately replaces image forming areas which display the right eye image and the left eye image, between the first image forming areas 21 and the second image forming areas 22. The overwriting period in this case need not be set to a constant period at all times.

That is, an overwriting period of a predetermined period is provided in which, the controlling apparatus 12 controlling, the stereoscopic image display apparatus 1 according to the present embodiment overwrites images while leaving the backlight 2 turned on without replacing image areas following switching of a frame after a period in which image forming areas which display a right eye image and a left eye image are replaced between the first image forming areas 21 and the second image forming areas 22 after the backlight 2 is turned off following switching of a frame. The stereoscopic image display method can be configured such that the overwriting period provided after the image area replacing period has a different duration from the overwriting period arranged before the image area replacing period.

For example, in a case where the frame frequency is set to 240 Hz in the above liquid crystal display 3, the controlling apparatus 12 performs control to simultaneously display a right eye image and a left eye image on one frame image following switching of a frame, turn off the backlight 2 without replacing image areas in subsequent three frames and overwrite images as is to display overwritten images in the next three frames on the liquid crystal display 3.

In this case, after the overwriting period of the 3 frame periods, the overwriting periods are assumed to be constant respectively which are provided after replacement of image areas by repeating a pattern of replacing image areas following turning off of the backlight 2 again, overwriting images, and then providing an overwriting period of three frame periods in which the backlight 2 is turned on.

By so doing, it is possible to display high-quality stereoscopic images of a high resolution without deterioration of resolution.

However, the controlling apparatus 12 controlling, the stereoscopic image display apparatus 1 according to the present embodiment can also display a right eye image and a left eye image respectively on the first image forming areas 21 and the second image forming areas 22 of one frame image displayed on the liquid crystal display 3, then provide overwriting periods of 5 frame periods and replace image areas following turning off of the backlight 2 and set the overwriting period which is subsequently provided, as one frame period when the backlight 2 is turned on. That is, it is also possible to provide, as different periods, the overwriting periods arranged respectively before and after a frame in which image areas are replaced.

In this case, display periods of a right eye image and a left eye image displayed on one image forming area become different. For example, a right eye image is displayed on the first image forming areas 21 for the overwriting periods of 5 frame periods, and then the right eye image is displayed on the second image forming areas 22 for the overwriting period of one frame period by replacing image areas following turning off of the backlight 2.

As a result, the display period of the right eye image on the first image forming areas 21 and the display period of the right eye image on the second image forming areas 22 become different, and therefore, in the above example, the display period of the first image forming areas 21 is longer.

Thus, when the display period of a right eye or left eye image on the first image forming areas 21 and the display period of a right eye or left eye image on the second image forming areas 22 become different, this has a influence on resolution of the stereoscopic image display in the liquid crystal display 3.

That is, with this overwriting period setting, it is possible to display stereoscopic images at levels of resolutions between a resolution of stereoscopic image display according to a use method in the case where image areas are not replaced and a high resolution of stereoscopic image display according to a use method in the case where the overwriting period provided after replacement of image areas is constant.

Consequently, the controlling apparatus 12 controlling, the stereoscopic image display apparatus 1 according to the present embodiment can form stereoscopic images by selecting the level of a resolution between a resolution of stereoscopic image display according to a use method in the case where image areas are not replaced and a resolution of stereoscopic image display according to a used method in the case where an overwriting period provided after replacement of image areas is constant.

The present invention is not limited to the above-mentioned embodiments and may be utilized without departing from the spirit and scope of the present invention.

For example, the stereoscopic image display apparatus 1 according to the present embodiment is configured to control the turn-on state of the backlight 2 according to timing to alternately replace image forming areas which display a right eye image and the left eye image, and selecting the turn-on state or turn-off state has been described as an example of the controlling method thereof. However, a method of controlling the level of brightness in the turn-on state of the backlight 2 can be adopted as another controlling method.

REFERENCE SIGNS LIST

1 Stereoscopic image display apparatus
2 Backlight
3 Liquid Crystal Display
5, 7, 45a, 45b, 45a', 45b' Polarizing plate
6 Liquid Crystal Panel
8 Retarder
9 Infrared ray emitting apparatus
10 Polarizing glass
11 Infrared ray sensor
12 Controlling apparatus
21 First image forming area
22 Second image forming area
23 Horizontal line
24 Light blocking units
25 Outer frame
26 Housing
27 Adhesive
31 First polarizing area
32 Second polarizing area
41, 41' Right eye glass
42, 42' Left eye glass
43a, 43b, 43a', 43b' ¼ Wave plate
44a, 44b TN Liquid Crystal cells
50 Viewer

The invention claimed is:

1. A stereoscopic image display apparatus comprising:
   a liquid crystal display which comprises a liquid crystal panel including a plurality of horizontal rows of pixels, the horizontal rows being arranged in a vertical direction of the liquid crystal display, and a pair of polarizing plates which sandwich the liquid crystal panel;
   a backlight located at a back surface of the liquid crystal display;
   an optical unit located at a front surface of the liquid crystal display;
   polarized eyeglasses, including a right eye glass and a left eye glass, having controllable polarization states, wherein a viewers wears the polarized eyeglass in viewing images on the liquid crystal display through the optical unit;
   a control apparatus which controls image display on the liquid crystal display, turning on and off of the backlight, and states of polarization of the left and right eye glasses of the polarized eyeglasses, wherein
     the liquid crystal display comprises a plurality of first image forming areas and a plurality of second image forming areas,
     each of the first and second image forming areas includes a plurality of contiguous horizontal rows of pixels of the liquid crystal panel,
     the first and second image forming areas alternate in the vertical direction of the liquid crystal display, and
     the control apparatus, controls the liquid crystal display to display, simultaneously, one of a right eye image and a left eye image on each of the first image forming areas, and to display the other of the right eye image and the left eye image on each of the second image forming areas,
     the control apparatus controls the first image forming areas and the second image forming areas so that,
       (1) each time a frame is switched, the right eye image replaces the left eve image that was displayed on one of the first and second image forming areas, and the left eye image replaces the right eye image that was displayed on one of the first and second image forming areas, and
       (2) each time a frame is overwritten, the right eye image replaces the left eye image that was displayed on one of the first and second image forming areas, and the left eye image replaces the right eye image that was displayed on one of the first and second image forming areas, or
       (3) each of the right eye image and the left eye image constantly appear on the same respective first and second image forming areas, without replacement by the other of the right eye image and the left eye image,
     illumination state of the backlight is controlled according to timing of replacement of the right eye image and the left eye image on the first and second image forming areas,
     the optical unit includes a plurality of first polarizing areas and a plurality of second polarizing areas which are alternatingly arranged at positions, and have sizes, corresponding to respective first image forming areas and second image forming areas, and (i) one of the first polarizing areas and the second polarizing areas includes a ½ wave plate, or (ii) both of the first polarizing areas and the second polarizing areas include ¼ wave plates having optical axes which are orthogonal to each other, and
     the right eye glass and the left eye glass are configured to replace polarization states of the right eye glass and the left eye glass in synchronization with the timing of replacement of the right eye image with the left eye image and the left eye image with the right eye image.

2. The stereoscopic image display apparatus according to claim 1, including a plurality of light blocking units, wherein each of the light blocking units is located at a boundary between one of the first polarizing areas and an adjacent one of the second polarizing areas of the optical unit.

3. The stereoscopic image display apparatus according to claim 1, wherein each of the first image forming areas and each of the second image forming areas comprises 2 to 60 contiguous horizontal rows of the pixels of the liquid crystal panel.

4. The stereoscopic image display apparatus according to claim 1, wherein each of the first image forming areas and each of the second image forming areas comprises 3 to 30 contiguous horizontal rows of the pixels of the liquid crystal panel.

5. The stereoscopic image display apparatus according to claim 1, wherein
the polarized eyeglasses comprise an infrared light sensor, and
the liquid crystal display comprises an infrared light emitting apparatus, wherein the infrared light emitting apparatus emits infrared light and the infrared light sensor detects the infrared light emitted in synchronization with the timing at which the first image forming areas and the second image forming areas switch between the right eye image and left eye image, and polarization states are alternately replaced in the right eye glass and the left eye glass.

6. The stereoscopic image display apparatus according to claim 1, wherein the right eye glass and the left eye glass include one of a twisted nematic liquid crystal element and a super twisted nematic liquid crystal element.

7. The stereoscopic image display apparatus according to claim 1, wherein the right eye glass and the left eye glass include one of a ferroelectric liquid crystal element and an antiferroelectric liquid crystal element.

8. The stereoscopic image display apparatus according to claim 1, wherein the right eye glass and the left eye glass include a liquid crystal element selected from the group consisting of a vertical alignment liquid crystal element, a homogenous electronically controlled birefringence (ECB) liquid crystal element, and a hybrid aligned-ECB liquid crystal element.

9. The stereoscopic image display apparatus according to claim 1, wherein the liquid crystal display switches frames at a frequency of at least 120 Hz.

10. The stereoscopic image display apparatus according to claim 9, wherein the liquid crystal display switches frames at a frequency of at least 240 Hz.

11. A method of displaying stereoscopic images on a stereoscopic image apparatus, the method comprising:
using
a liquid crystal display, which comprises a liquid crystal panel having a plurality of horizontal rows of pixels arranged in a vertical direction of the liquid crystal display and including a plurality of first image forming areas and a plurality of second image forming areas, each of the first and second image forming areas including a plurality of contiguous horizontal rows of pixels, the first and second image forming areas alternating in the vertical direction of the liquid crystal display,
a backlight which is located at a back side of the liquid crystal display,
an optical unit which is located at a front side of the liquid crystal display, wherein the optical unit includes a plurality of first polarizing areas and a plurality of second polarizing areas arranged at positions, and having sizes, corresponding to respective first image forming areas and second image forming areas, and (i)one of the first polarizing areas and the second polarizing areas includes a ½ wave plate, or (ii) both of the first polarizing areas and the second polarizing areas include ¼ wave plates having optical axes which are orthogonal to each other,
polarized eyeglasses which comprise a right eye glass and a left eye glass having controllable polarization states, and
a control apparatus which controls image display on the liquid crystal display, turning on and off the backlight, and the polarization states of the right and left eye glasses of the polarized eyeglasses; and
simultaneously displaying one of a right eye image and a left eye image on the first image forming areas and the other of the right eye image and the left eye image on the second image forming areas so a viewer wearing the polarized eyeglasses may view a stereoscopic image, and
(1) maintaining the right eye image and the left eye image on the respective first and second image forming areas, without replacing the right eye image with the left eye image and without replacing the left eye image with the right eye image on the first and second image forming areas, or
(2) when a frame is switched from one frame to a subsequent frame or an image is overwritten, replacing the right eye image with the left eye image and the left eye image with the right eye image in the respective first and second image forming areas, and, according to timing of replacement of the right and left eye images, controlling illumination of the backlight, and the polarization states of the right eye glass and the left eye glass of the polarized eyeglasses.

12. The stereoscopic image display method according to claim 11, wherein, in overwriting an image, overwriting of the right eye image and overwriting of the left eye image for different periods of time in the first image forming areas and the second image forming areas.

* * * * *